(12) United States Patent
Kim

(10) Patent No.: US 12,214,555 B2
(45) Date of Patent: Feb. 4, 2025

(54) DEPOSITION DATA COLLECTION APPARATUS AND THREE-DIMENSIONAL OBJECT MANUFACTURING SYSTEM INCLUDING THE SAME

(71) Applicant: Jong Young Kim, Icheon-si (KR)

(72) Inventor: Jong Young Kim, Icheon-si (KR)

( * ) Notice: Subject to any disclaimer, the term of this patent is extended or adjusted under 35 U.S.C. 154(b) by 307 days.

(21) Appl. No.: 17/625,747

(22) PCT Filed: Jul. 10, 2020

(86) PCT No.: PCT/KR2020/009069
§ 371 (c)(1),
(2) Date: Jan. 8, 2022

(87) PCT Pub. No.: WO2021/006685
PCT Pub. Date: Jan. 14, 2021

(65) Prior Publication Data
US 2022/0339879 A1 Oct. 27, 2022

(30) Foreign Application Priority Data

Jul. 10, 2019 (KR) .......................... 10-2019-0083517
Dec. 2, 2019 (KR) .......................... 10-2019-0158465

(51) Int. Cl.
*B29C 64/393* (2017.01)
*B29C 64/106* (2017.01)
(Continued)

(52) U.S. Cl.
CPC .......... *B29C 64/393* (2017.08); *B29C 64/106* (2017.08); *B29C 64/209* (2017.08);
(Continued)

(58) Field of Classification Search
CPC ... B29C 64/393; B29C 64/209; B29C 64/106; B29C 64/386; B33Y 30/00; B33Y 50/00; B33Y 50/02
(Continued)

(56) References Cited

U.S. PATENT DOCUMENTS

2016/0039148 A1* 2/2016 Marino ................ B29C 64/393
425/150
2017/0056970 A1* 3/2017 Chin ...................... B22D 11/01

FOREIGN PATENT DOCUMENTS

KR         101613628      *  4/2016
KR     10-16136280000        5/2016
(Continued)

OTHER PUBLICATIONS

Shin et al., KR101613628, Apr. 12, 2024, machine translation to English (Year: 2016).*

*Primary Examiner* — Galen H Hauth
*Assistant Examiner* — Lawrence D. Hohenbrink, Jr.
(74) *Attorney, Agent, or Firm* — Bridgeway IP Law Group, PLLC; Jihun Kim

(57) ABSTRACT

Disclosed is a deposition data collection apparatus including: a printing unit including: an extruder for ejecting a material supplied from an external material source; and a printer head for moving the extruder in a predetermined direction such that the material ejected from the extruder are sequentially deposited along an arbitrary deposition path on an XYZ coordinate system to form a target three-dimensional object; and a scanning unit including: a sensing module for sensing movement of at least one of the extruder and the printer head; and a data collection module for chronologically collecting material deposition data including the arbitrary deposition path, based on the movement sensed by the sensing module.

15 Claims, 18 Drawing Sheets

(51) Int. Cl.
   *B29C 64/209*   (2017.01)
   *B33Y 30/00*   (2015.01)
   *B33Y 50/02*   (2015.01)
   *B29C 64/386*   (2017.01)
   *B33Y 50/00*   (2015.01)

(52) U.S. Cl.
   CPC ............... *B33Y 30/00* (2014.12); *B33Y 50/02* (2014.12); *B29C 64/386* (2017.08); *B33Y 50/00* (2014.12)

(58) Field of Classification Search
   USPC .......................................................... 425/135
   See application file for complete search history.

(56) References Cited

FOREIGN PATENT DOCUMENTS

| | | |
|---|---|---|
| KR | 10-2018-0118692 | 10/2018 |
| KR | 20180118692 A * | 10/2018 |
| KR | 10-19187540000 | 11/2018 |
| WO | WO2017152142 A1 * | 8/2017 |
| WO | WO2019018443 A1 * | 1/2019 |

\* cited by examiner

[FIG. 1]
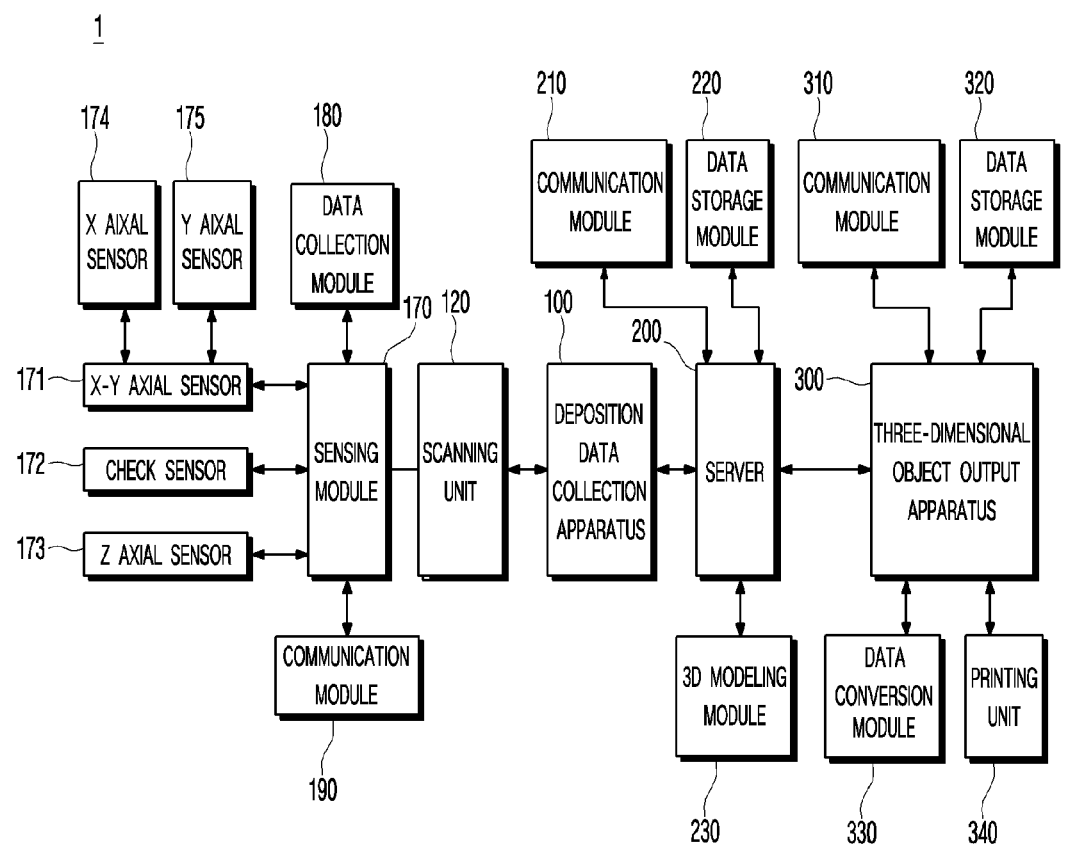

[FIG. 2]
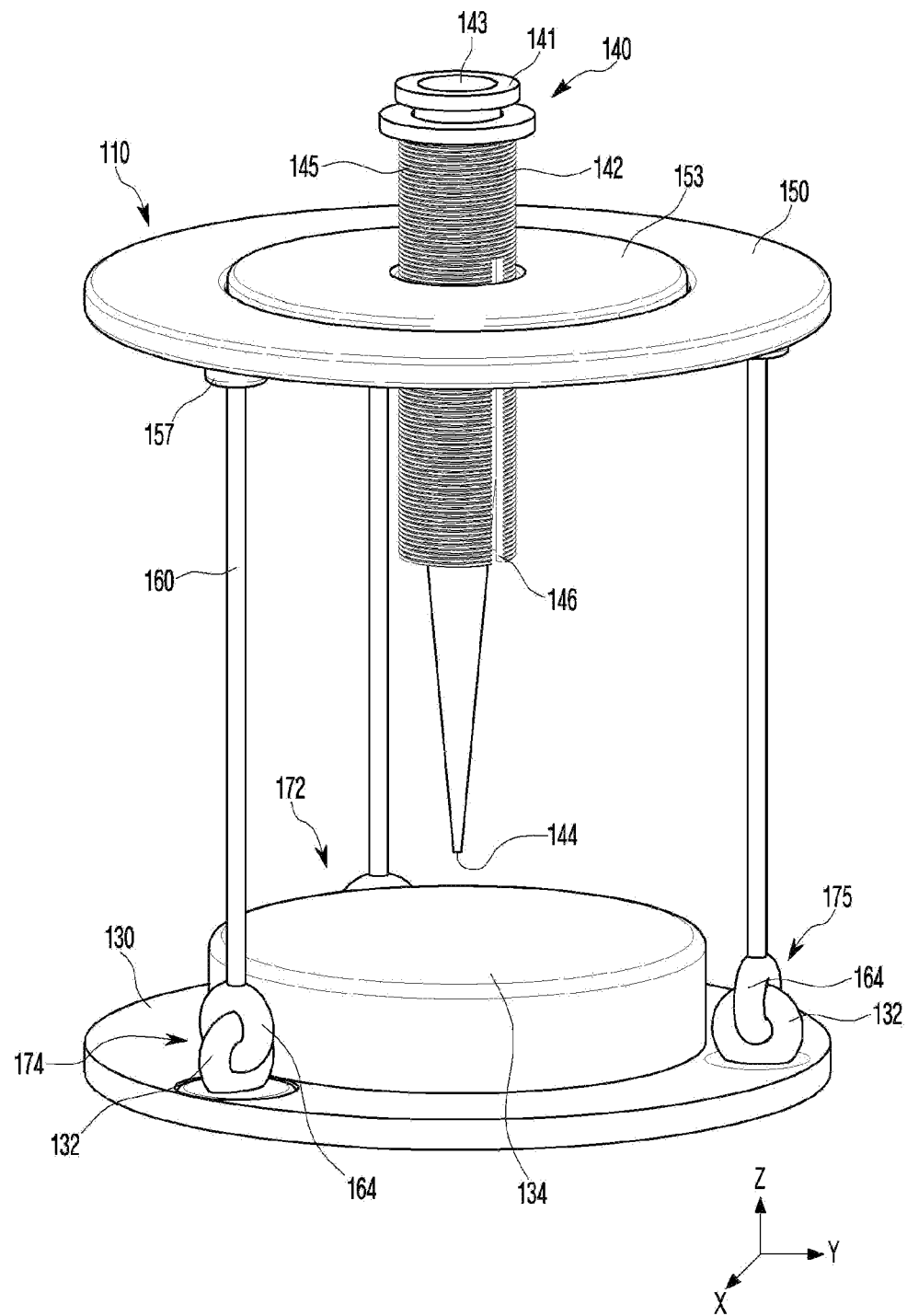

[FIG. 3]
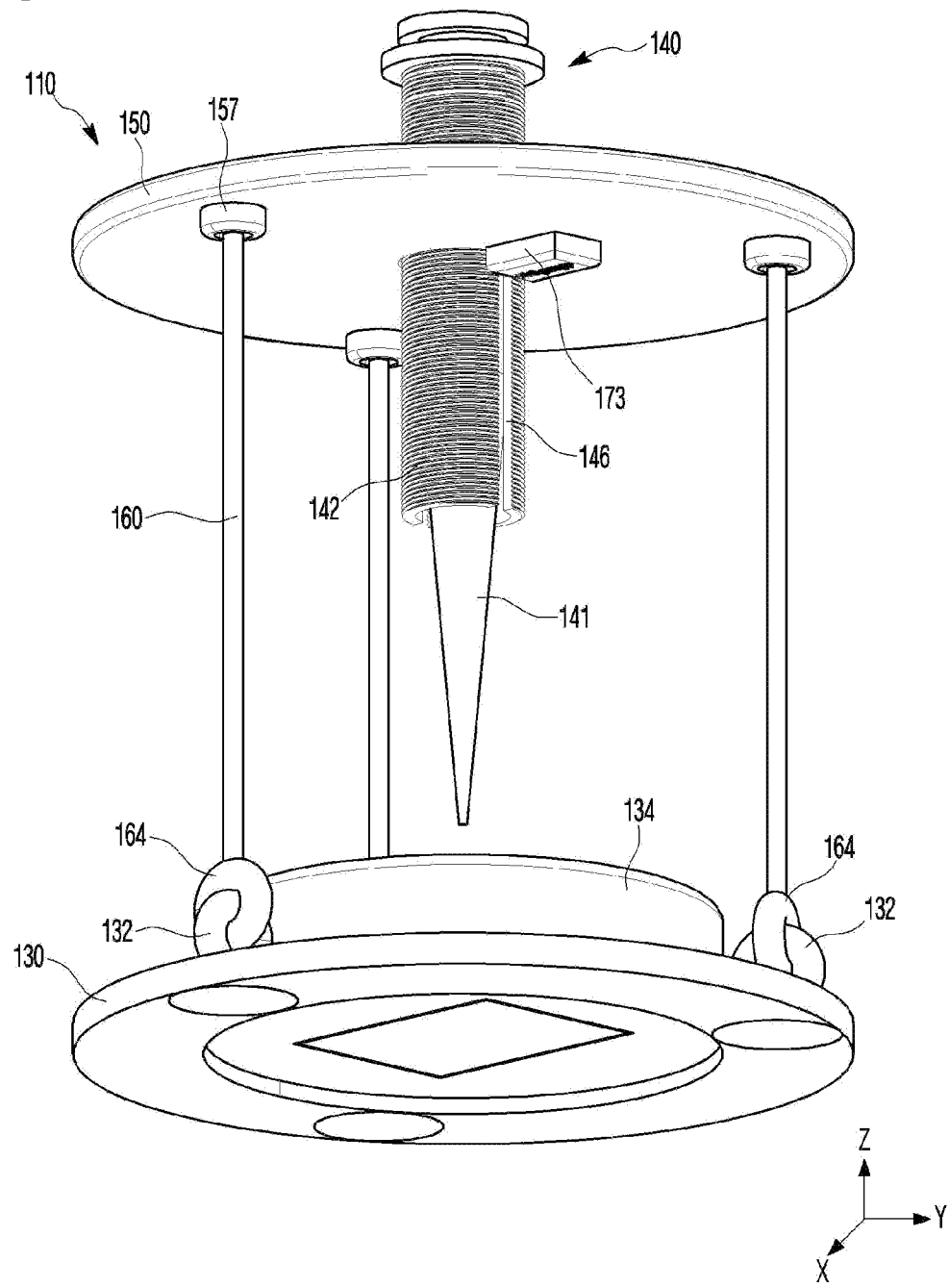

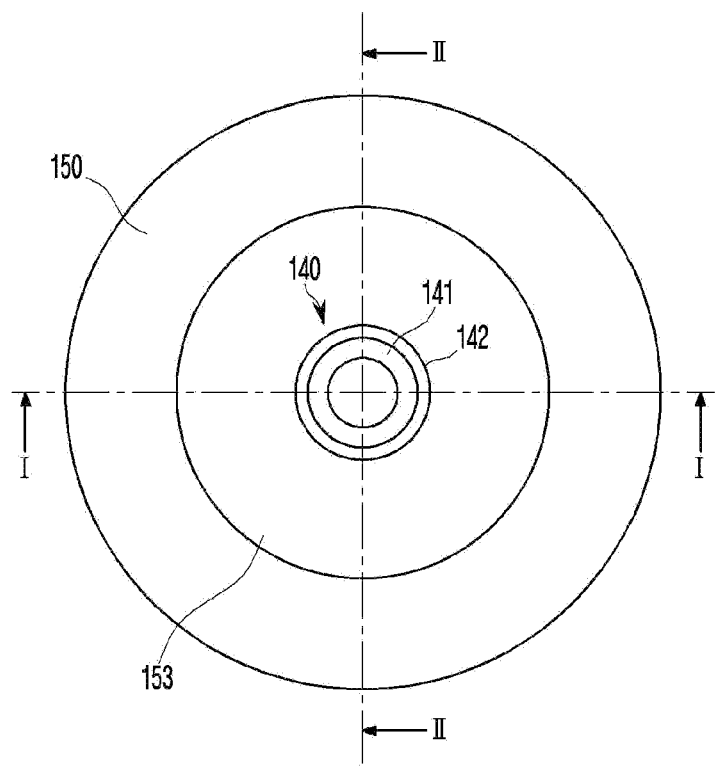
[FIG. 4]

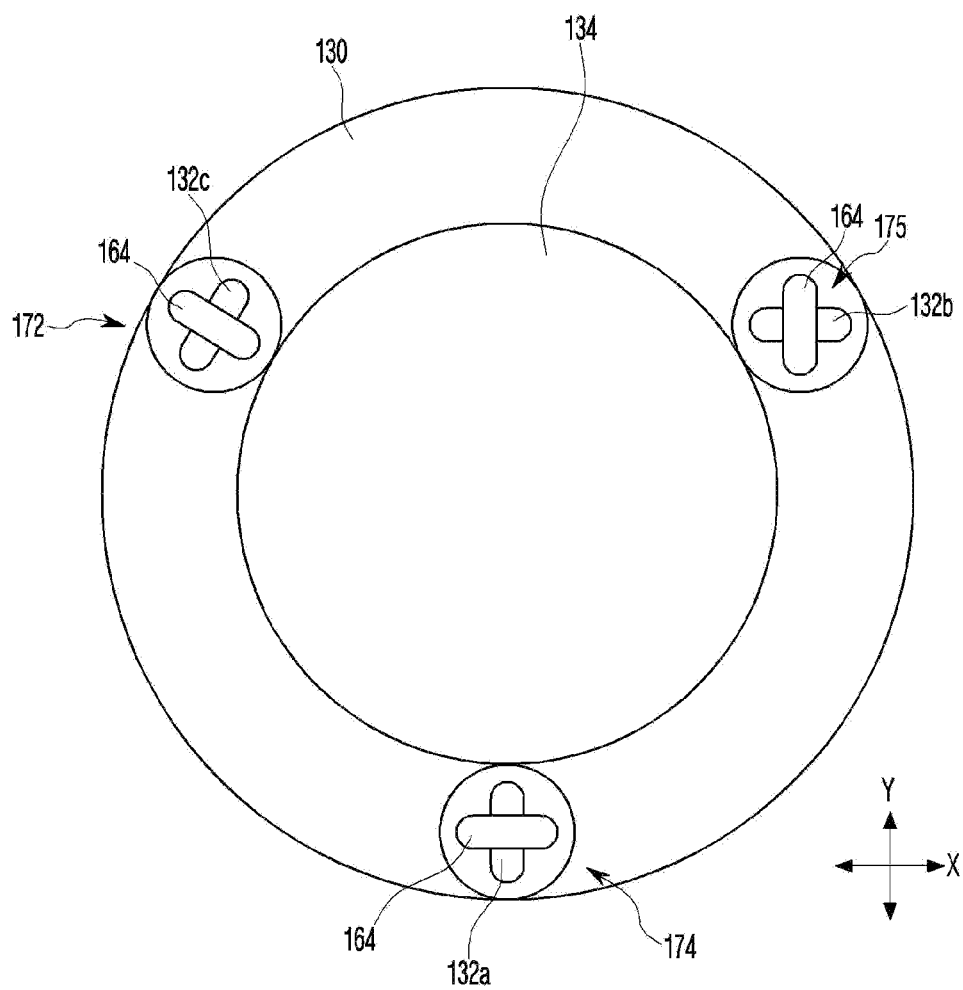
[FIG. 5]

[FIG. 6]
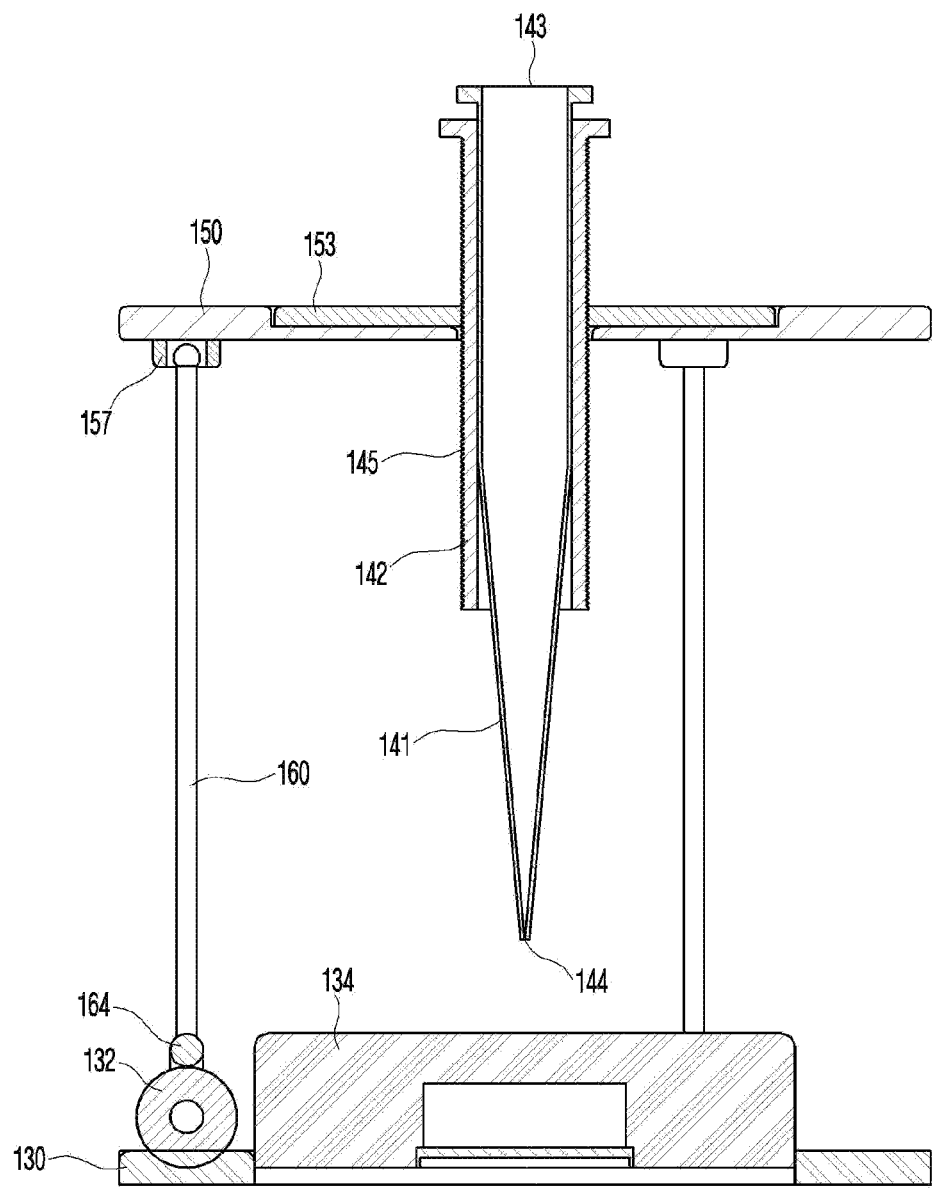

[FIG. 7]
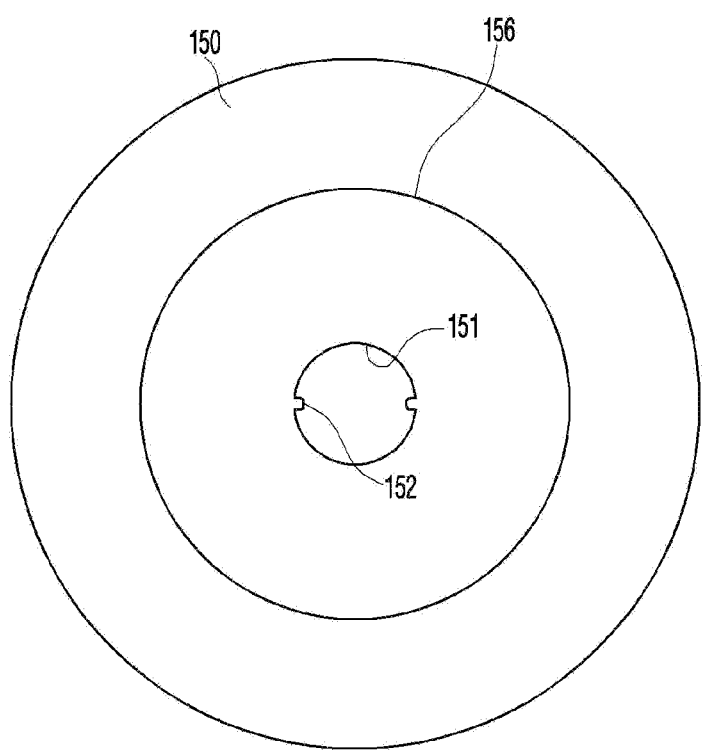

[FIG. 8]
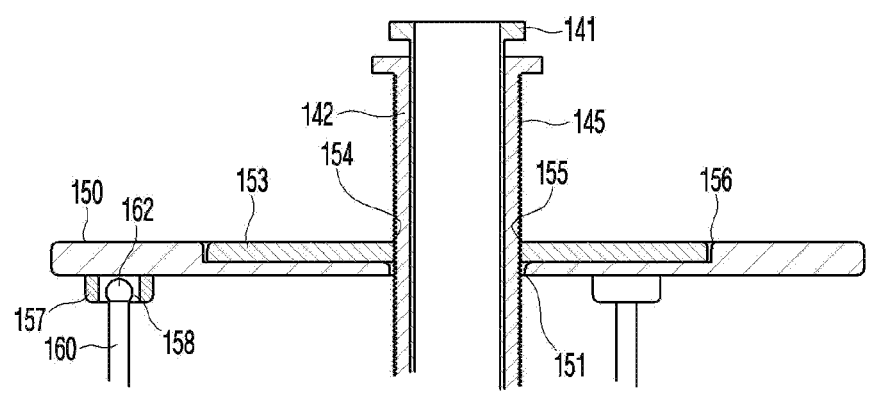

[FIG. 9]
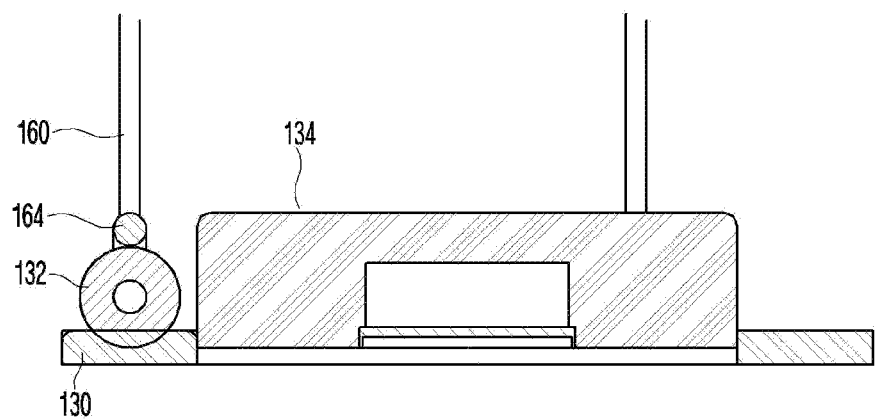

[FIG. 10]
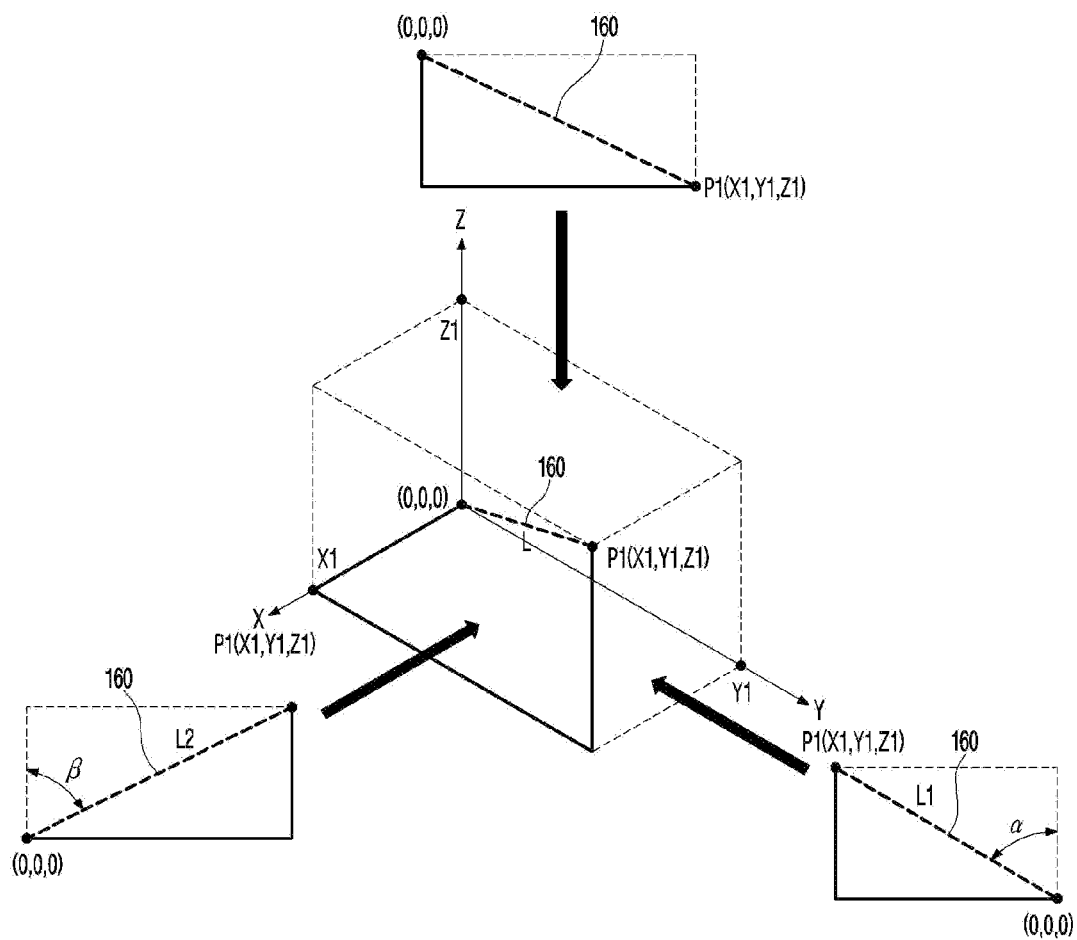

[FIG. 11]
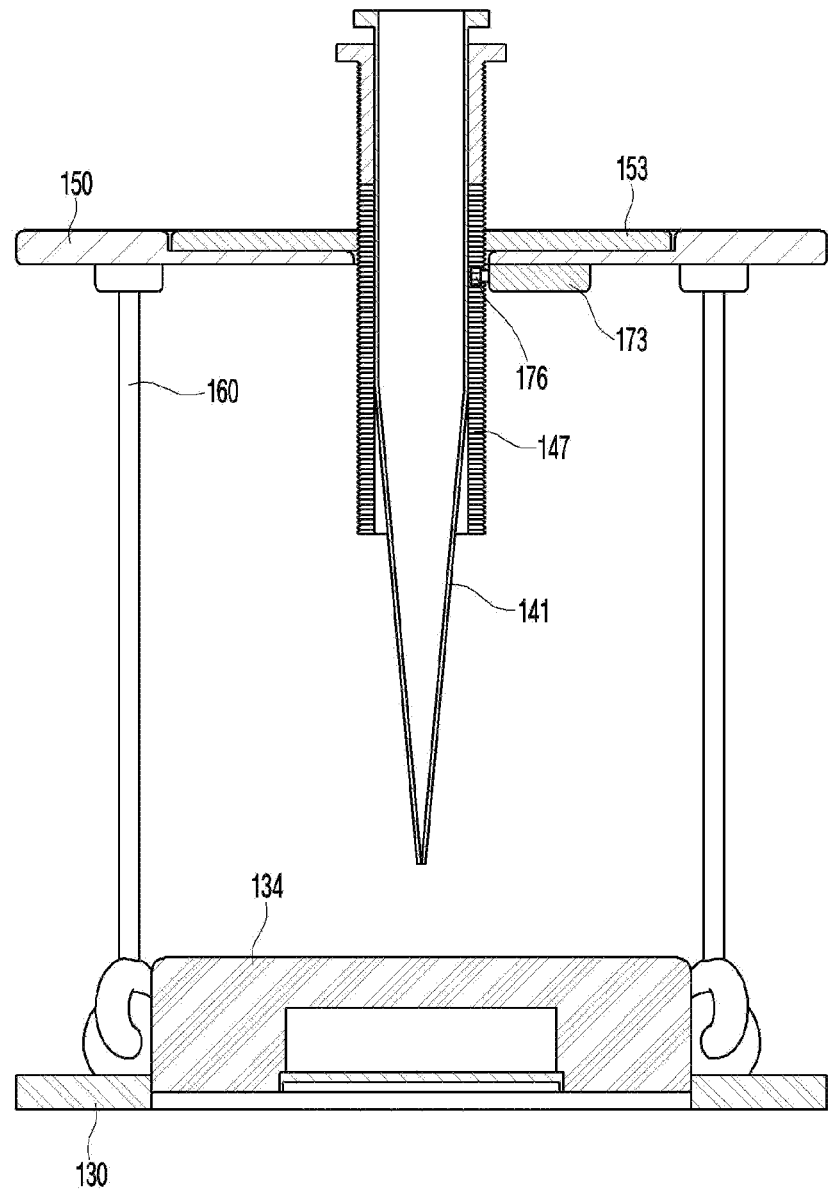

【FIG. 12】
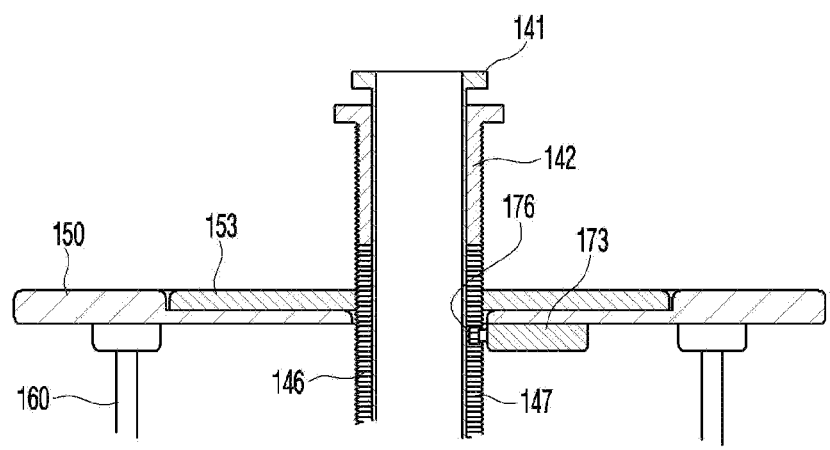

[FIG. 13]
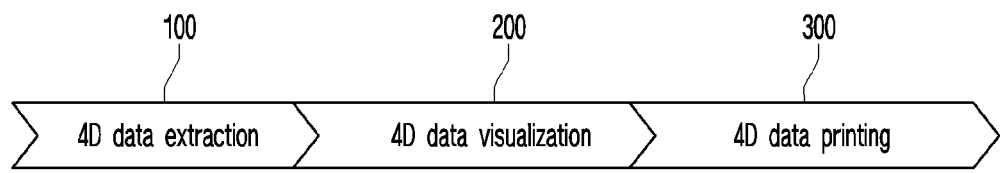

[FIG. 14]
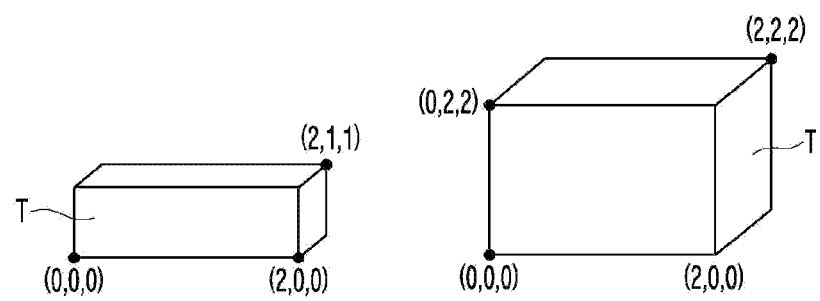

[FIG. 15]
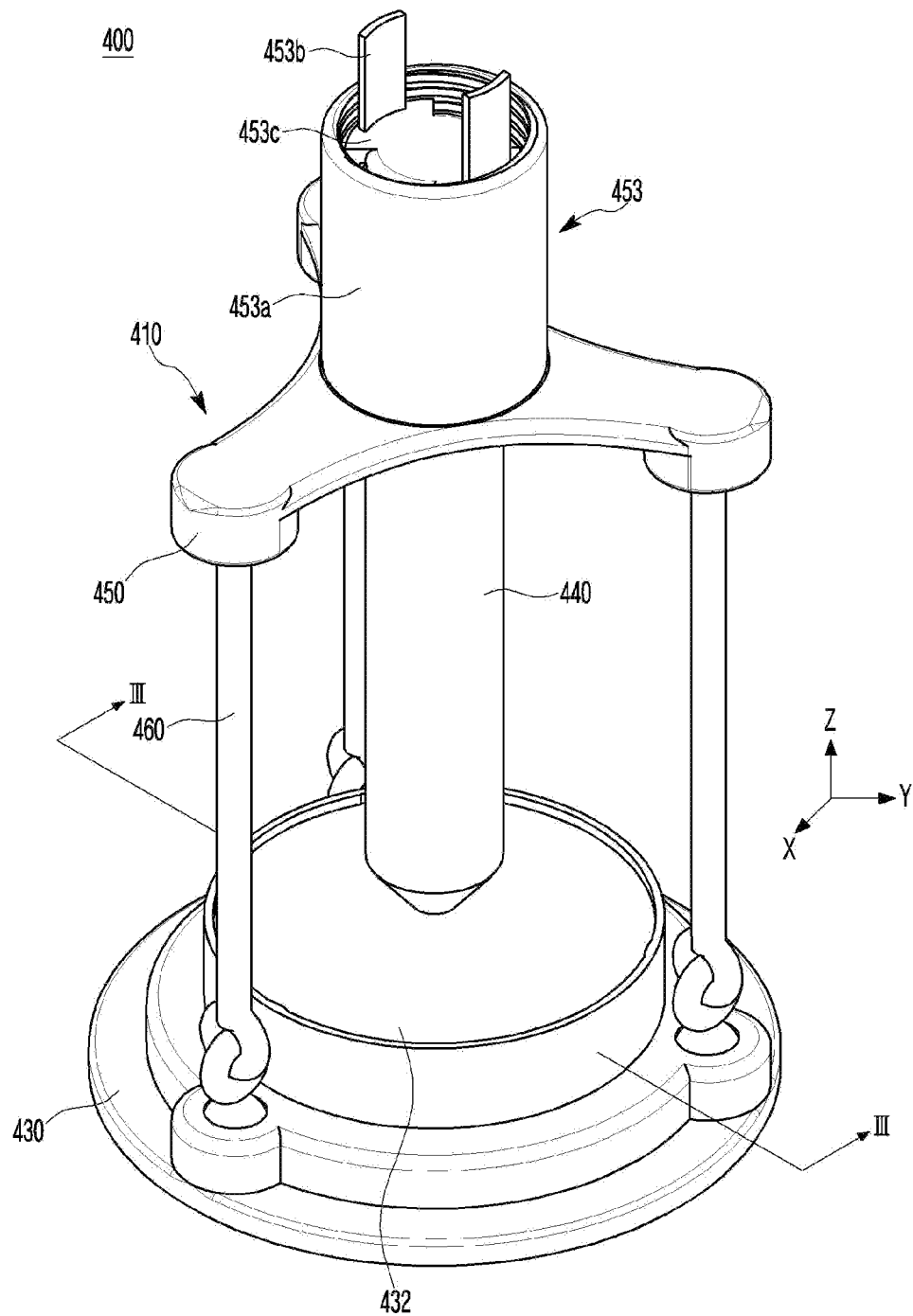

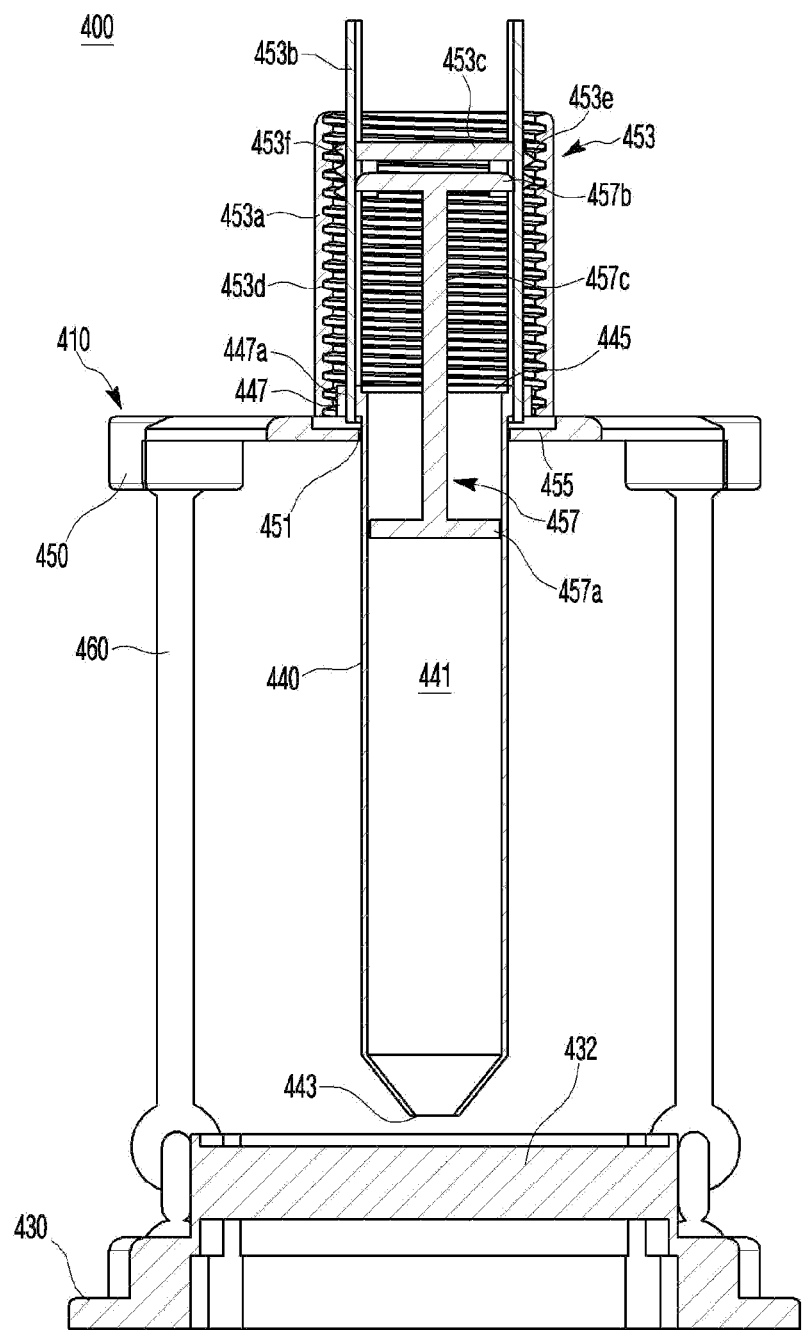
[FIG. 16]

[FIG. 17]
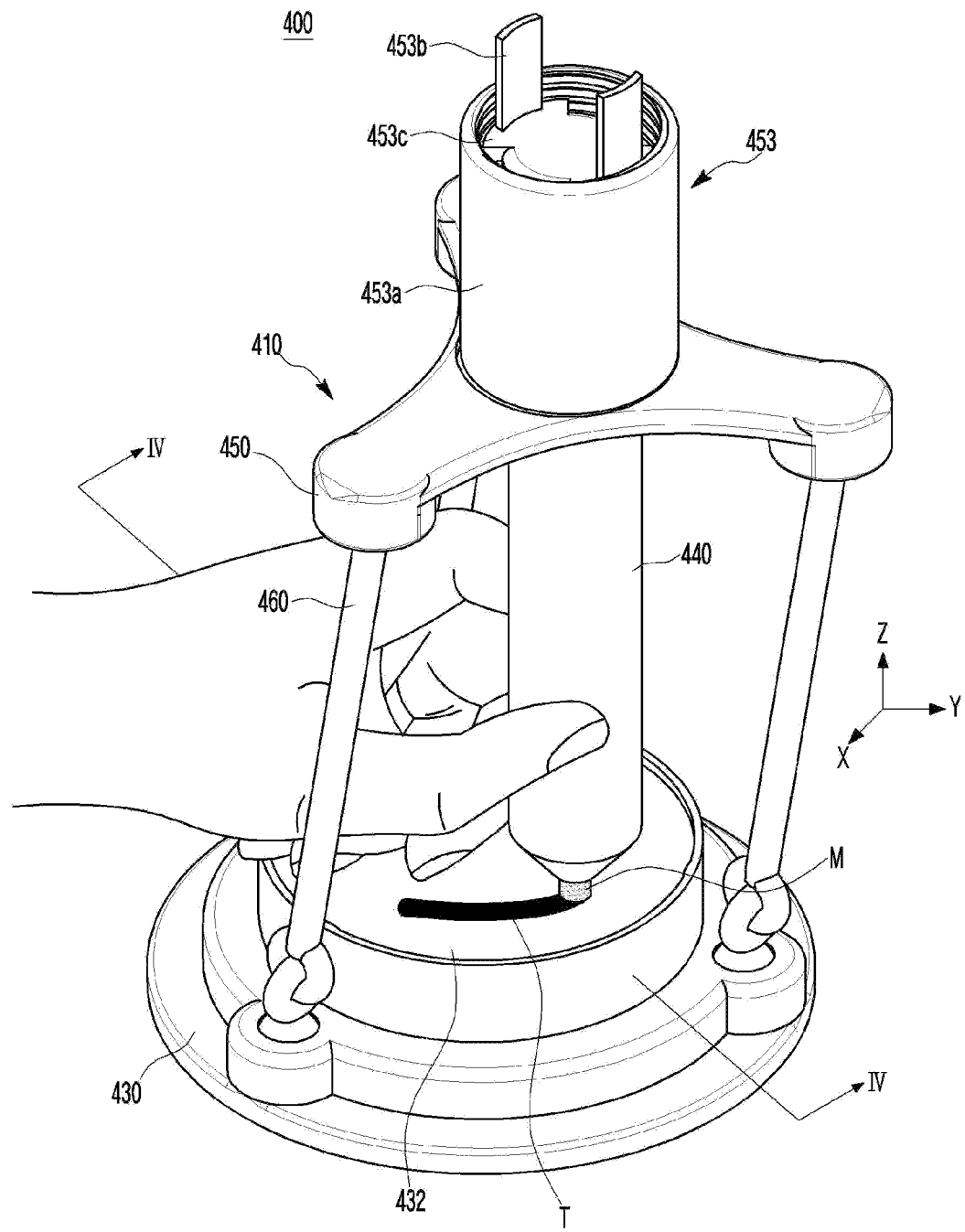

【FIG. 18】
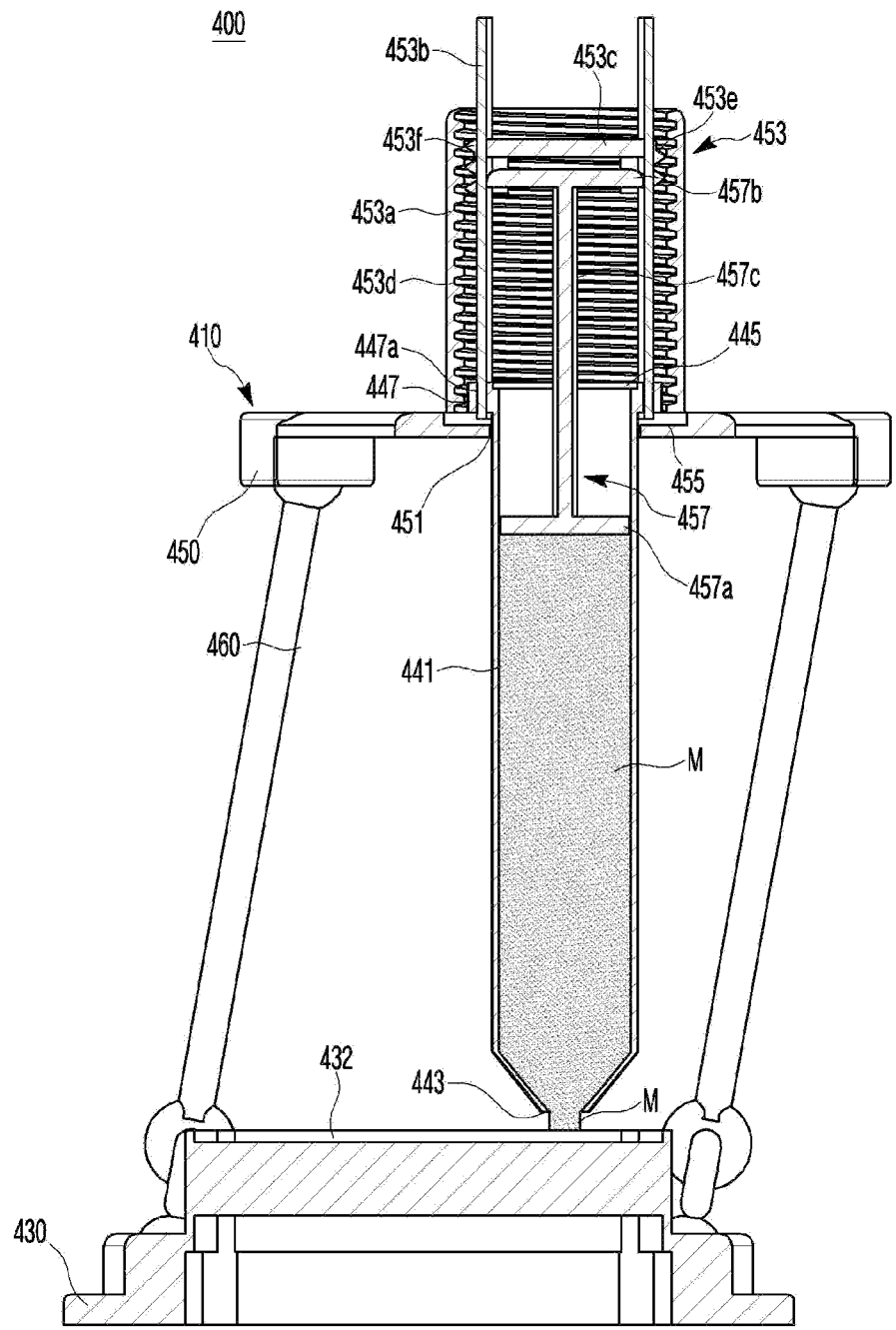

DEPOSITION DATA COLLECTION APPARATUS AND THREE-DIMENSIONAL OBJECT MANUFACTURING SYSTEM INCLUDING THE SAME

TECHNICAL FIELD

The present disclosure relates to a deposition data collection apparatus and a three-dimensional object manufacturing system including the same.

The present application claims priority to and the benefit of Korean Patent Application No. 10-2019-0083517 filed on Jul. 10, 2019 and Korean Patent Application No. 10-2019-0158465 filed on Dec. 2, 2019, the disclosure of which is incorporated herein by reference in its entirety.

BACKGROUND ART

Recently, use of 3D printing technology for manufacturing a three-dimensional object by depositing various materials based on three-dimensionally designed data is rapidly increasing.

A conventional 3D printing method includes scanning an outer shape of a pre-manufactured target three-dimensional object using a scanner to generate a 3D modeling data, converting the 3D modeling data into a format applicable to a 3D printer via a data conversion process such as slicing, G-code generation, etc., and operating the 3D printer based on the converted 3D modeling data format to output a product having a three-dimensional structure corresponding to a target three-dimensional object.

However, when the 3D modeling data is generated by scanning the outer shape of the pre-manufactured target three-dimensional object as in the prior art, a following problem may occur: when there is a feature in a generating process of the target three-dimensional object or in an inside of the target three-dimensional object, or when the target three-dimensional object is an irregular three-dimensional object such as food, a handicraft, an art product, etc., accurate 3D modeling data of the target three-dimensional object may not be collected, and thus a quality of the product manufactured by the 3D printing is poor.

DISCLOSURE

Technical Problem

Therefore, the present disclosure has been made in view of the above problems, and it is one object of the present disclosure to provide a deposition data collection apparatus that is improved to collect material deposition data including information on a process of forming a target three-dimensional object via chronological deposition of a material, and a three-dimensional object manufacturing system including the same.

It is another object of the present disclosure to provide a three-dimensional object structure information collection apparatus improved to collect material deposition data including information on both an inner structure and an outer structure of a target three-dimensional object, and a three-dimensional object manufacturing system including the same.

Technical Solution

In accordance with one aspect of the present disclosure, provided is a deposition data collection apparatus comprising: a printing unit including: an extruder for ejecting a material supplied from an external material source; and a printer head for moving the extruder in a predetermined direction such that the material ejected from the extruder are sequentially deposited along an arbitrary deposition path on an XYZ coordinate system to form a target three-dimensional object; and a scanning unit including: a sensing module for sensing movement of at least one of the extruder and the printer head; and a data collection module for chronologically collecting material deposition data including the arbitrary deposition path, based on the movement sensed by the sensing module.

Preferably, the extruder is coupled to the printer head so as to move along the printer head, wherein the printing unit further includes: a printer base installed to be spaced apart from the printer head in a Z-axis direction on a XYZ coordinate system; and at least one hinge pin for hinge-coupling the printer head and the printer base each other such that the printer head is moveable in at least one of an X-axis direction and a Y-axis direction on the XYZ coordinate system.

Preferably, the sensing module includes an X-Y axial sensor for sensing at least one of: a first inclination angle indicating an angle at which each of the hinge pins is inclined from the Z-axis direction toward the X-axis direction on the XYZ coordinate system; and a second inclination angle indicating an angle at which each of the hinge pins is inclined from the Z-axis direction toward the Y-axis direction on the XYZ coordinate system, wherein the data collection module calculates a movement coordinate of the extruder in at least one of the X-axis and the Y-axis, based on the at least one inclination angle sensed by the X-Y axial sensor.

Preferably, the first inclination angle is an inclination angle measured based on the Z-axis direction on an XZ plane of the XYZ coordinate system, wherein the second inclination angle is an inclination angle measured based on the Z-axis direction on a YZ plane of the XYZ coordinate system.

Preferably, the data collection module calculates a displacement amount by which the printer head moves in the Z-axis direction when each of the hinge pins is tilted, based on the at least one inclination angle.

Preferably, the data collection module collects the deposition data based on the movement coordinate of the extruder.

Preferably, the printer base has at least one first hinge ring having a ring shape, wherein each of the hinge pins has a second hinge ring having a ring shape and rotatably fastened to each of the first hinge rings.

Preferably, the X-Y axial sensor measures a rotation angle by which the second hinge ring rotates about the first hinge ring when the at least one hinge pin is tilted in association with the movement of the printer head, wherein the data collection module calculates the at least one inclination angle based on the measured rotation angle.

Preferably, the X-Y axial sensor includes a capacitive type angle sensor for sensing change in capacitance generated when the second hinge ring rotates around the first hinge ring.

Preferably, the X-Y axial sensor includes: a X axial sensor for measuring a first rotation angle by which a second hinge ring fastened to one of the first hinge rings rotates around the Z-axis direction on the XZ plane of the XYZ coordinate system; and a Y axial sensor for measuring a second rotation angle by which a second hinge ring fastened to another of the first hinge rings rotates around the Z-axis direction on the YZ plane of the XYZ coordinate system, wherein the data collection module calculates the first inclination angle based on the first rotation angle and calculates the second inclination angle based on the second rotation angle.

Preferably, the one of the first hinge rings is installed so that a center-axis direction thereof coincides with the X-axis direction, wherein the another first hinge ring is installed so that a center-axis direction thereof coincides with the Y-axis direction.

Preferably, still another first hinge ring of the first hinge rings is installed such that a center-axis direction thereof defines a predetermined angle with respect to each of the X-axis direction and the Y-axis direction on the XY plane on the XYZ coordinate system, wherein the sensing module further includes a check sensor for sensing a third rotation angle by which a second hinge ring fastened to the still another first hinge ring rotates around the Z axial direction on a two-dimensional plane defined by the Z axis and a central axis of the still another first hinge ring, wherein the data collection module determines whether the X-Y axial sensor is abnormal, based on the third rotation angle sensed by the check sensor.

Preferably, the data collection module is configured to determine that abnormality has occurred in the X-Y axial sensor when a displacement of the third rotation angle is detected by the check sensor but a displacement of at least one of the first rotation angle and the second rotation angle is not detected by the X-Y axial sensor.

Preferably, the printing unit further includes a Z-axis direction transfer member for transferring the extruder in a Z-axis direction on the XYZ coordinate system, wherein the sensing module has a Z-axis direction sensor for sensing movement of the extruder in the Z-axis direction.

Preferably, the printer head has a first receiving hole defined therein into which the extruder is inserted so as to be movable in the Z-axis direction, wherein the Z-axis direction transfer member has a second receiving hole defined therein into which the extruder is inserted so as to be movable in the Z-axis direction.

Preferably, the extruder has a guide groove recessed in an outer circumferential face thereof and extending in the Z-axis direction, wherein the printer head further includes a guide protrusion extending in the Z-axis direction and protruding from an inner circumferential face of the first receiving hole so as to be inserted into the guide groove.

Preferably, the Z-axis direction transfer member is coupled to the printer head so as to be rotatable about the Z axis in the XYZ coordinate system, wherein the extruder further has a first screw thread formed on an outer circumferential face thereof, wherein the Z-axis direction transfer member further has a second screw thread formed on an inner circumferential face of the second receiving hole so as to be screw-coupled to the first screw thread.

Preferably, the extruder further includes a rack gear formed on an inner circumferential face of the guide groove and along the Z-axis direction, wherein the Z axial sensor has a pinion gear meshed with the rack gear, wherein the Z axial sensor is fixedly installed at a predetermined position of the printer head, and configured to measure a number of rotations by and a rotation direction in which the pinion gear rotates under movement of the rack gear when the extruder is transferred in the Z-axis direction by the Z-axis direction transfer member.

Preferably, the data collection module calculates a Z-axis movement coordinate of the extruder based on the number of rotations and the rotation direction of the pinion gear.

Preferably, the printing unit further includes a build plate on which the material ejected from the extruder is deposited.

Advantageous Effects

The present disclosure relates to a deposition data collection apparatus and a three-dimensional object manufacturing system including the same. The deposition data collection apparatus may generate 3D coordinate data of each of all of layers of the target three-dimensional object using the material deposition data as collected to include information on a formation process of the target three-dimensional object via chronological deposition of a material when the target three-dimensional object is formed by depositing the material, and may combine the 3D coordinate data of the all layers as generated with each other to generates the 3D modeling data.

According to the present disclosure, the 3D modeling data including information on the inner structure of the target three-dimensional object may be generated without need to estimate the inner structure of the target three-dimensional object using reverse engineering SW. Accordingly, the apparatus according to the present disclosure may obtain the 3D modeling data including accurate information about the inner and outer structures of an irregular three-dimensional object. Thus, the apparatus may be applied not only to 3D printing of a product with a clearly defined dimension of the product, but also to 3D printing of a product having an irregular shape such as food.

BRIEF DESCRIPTION OF DRAWINGS

FIG. 1 is a block diagram illustrating a schematic configuration of a three-dimensional object manufacturing system according to a first embodiment of the present disclosure.

FIG. 2 is a perspective view of a deposition data collection apparatus shown in FIG. 1 as viewed from above.

FIG. 3 is a perspective view of the deposition data collection apparatus shown in FIG. 2 as viewed from below.

FIG. 4 is a plan view of the deposition data collection apparatus shown in FIG. 2.

FIG. 5 is a plan view of a printer base shown in FIG. 2.

FIG. 6 is a cross sectional view taken along line I-I' in FIG. 4.

FIG. 7 is a plan view of a printer head shown in FIG. 2.

FIG. 8 and FIG. 9 are partially enlarged views of FIG. 6.

FIG. 10 is a conceptual diagram illustrating a method for collecting material deposition data using hinge pin inclination.

FIG. 11 is a cross sectional view taken along line II-II' in FIG. 4.

FIG. 12 is a partial enlarged view of FIG. 11.

FIG. 13 is a flowchart for illustrating a three-dimensional object manufacturing method using the three-dimensional object manufacturing system shown in FIG. 1.

FIG. 14 is a diagram illustrating a method for generating 3D modeling data of a target three-dimensional object via conversion of deposition data.

FIG. 15 is a perspective view of a deposition data collection apparatus of a three-dimensional object manufacturing system according to a second embodiment of the present disclosure.

FIG. 16 is a cross sectional view taken along line in FIG. 15.

FIG. 17 is a perspective view showing a tilted state of hinge pins in the deposition data collection apparatus shown in FIG. 15.

FIG. 18 is a cross-sectional view taken along line IV-IV' in FIG. 17.

BEST MODE

Hereinafter, some embodiments of the present disclosure will be described in detail with reference to exemplary drawings. It should be noted that in allocating reference numerals to components in each drawing, the same components are given the same reference numerals even though they are shown in different drawings. Further, when it is determined that a detailed description of a related known configuration or function interferes with an understanding of the embodiment of the present disclosure in describing an embodiment of the present disclosure, a detailed description thereof will be omitted.

In describing the components of the embodiment according to the present disclosure, terms such as first, second, A, B, (a), (b), and the like may be used. These terms are merely intended to distinguish among the components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a schematic configuration of a three-dimensional object manufacturing system according to a first embodiment of the present disclosure.

Referring to FIG. 1, a three-dimensional object manufacturing system 1 according to the first embodiment may include a deposition data collection apparatus 100 configured to collect material deposition data including information on a process of forming a target three-dimensional object T by depositing a material, a server 200 configured to convert the deposition data received from the deposition data collection apparatus 100 to generate 3D modeling data about the target three-dimensional object T, and a three-dimensional object output apparatus 300 configured to deposit the material based on the 3D modeling data received from the server 200 to output a product having a three-dimensional structure corresponding to the target three-dimensional object T.

FIG. 2 is a perspective view of the deposition data collection apparatus shown in FIG. 1 as viewed from above, FIG. 3 is a perspective view of the deposition data collection apparatus shown in FIG. 2 as viewed from below, and FIG. 4 is a plan view of the deposition data collection apparatus shown in FIG. 2.

First, the deposition data collection apparatus 100 is an apparatus for collecting the material deposition data including the information on the process of forming the target three-dimensional object T by depositing the material.

A structure of the deposition data collection apparatus 100 is not particularly limited. For example, as shown in FIG. 1 and FIG. 2, the deposition data collection apparatus 100 may include a printing unit 110 configured to sequentially deposit the material along an arbitrary deposition path to form the target three-dimensional object T, and a scanning unit 120 configured to sense a material deposition process along the arbitrary deposition path using the printing unit 110 and collect the material deposition data including information on the arbitrary deposition path of the material and the additive manufacturing process of the target three-dimensional object T. Here, the arbitrary deposition path refers to a path along which the material may be deposited to form the target three-dimensional object T of an irregular shape when an operator manually manipulates the printer head 150 according to his/her own discretion.

The printing unit 110 is configured such that the operator may manually deposit the material to form the target three-dimensional object T. A structure of the printing unit 110 is not particularly limited. For example, as shown in FIGS. 2 to 4, the printing unit 110 may include a printer base 130, an extruder 140 configured to eject the material supplied from an external material source toward the printer base 130, a printer head 150 configured to transport the extruder 140 in a predetermined direction such that the material ejected from the extruder 140 is sequentially deposited on the printer base 130 along the arbitrary deposition path in a XYZ coordinate system to form the target three-dimensional object T, and at least one hinge pin 160 configured to hinge-connect the printer head 150 and the printer base 30 to each other.

Here, the XYZ coordinate system refers to a three-dimensional coordinate system for specifying the arbitrary deposition path of the material, and a three-dimensional structure of the target three-dimensional object T based on the arbitrary deposition path of the material. Further, in the XYZ coordinate system, an X-axis direction refers to a transverse direction of the target three-dimensional object T, a Y-axis direction refers to a longitudinal direction of the target three-dimensional object T, and a Z-axis direction refers to a height direction of the target three-dimensional object T.

FIG. 5 is a plan view of the printer base shown in FIG. 2, FIG. 6 is a cross sectional view taken along line I-I' in FIG. 4, FIG. 7 is a plan view of the printer head shown in FIG. 2, and FIG. 8 and FIG. 9 are partially enlarged views of FIG. 6.

The printer base 130 is a member that supports components of the printing unit 110. The printer base 130 may be seated on a ground. However, the disclosure is not limited thereto. A shape of the printer base 130 is not particularly limited. For example, as shown in FIG. 2, the printer base 130 may have a disk shape.

As shown in FIG. 2, the printer base 130 may include at least one first hinge ring 132 having a ring shape, and a build plate 134 on which the material ejected from the extruder 140 is deposited.

The first hinge ring 132 may be fixedly installed on a top surface of the printer base 130. As shown in FIG. 5, when a plurality of first hinge rings 132 are installed, the first hinge rings 132 may be disposed on the top surface of the printer base 130 and be radially arranged at constant intervals. In particular, as shown in FIG. 5, one first hinge ring 132a of the first hinge rings 132 may be installed such that a center-axis direction thereof is aligned with the X-axis direction, another first hinge ring 132b of the first hinge rings 132 may be installed such that a center-axis direction thereof coincides with the Y-axis direction, and still another first hinge ring 132c of the first hinge rings 132 may be installed such that a center-axis direction thereof may define a predefined angle with respect to each of the X-axis direction and the Y-axis direction on a XY plane of the XYZ coordinate system.

The build plate 134 may be fixedly installed on an inner region of the top surface of the printer base 130 so as not to interfere with the first hinge rings 132. A shape of the build plate 134 is not particularly limited. For example, the build plate 134 may have a disk shape having a smaller diameter than that of the printer base 130.

The extruder 140 is a member for forming the target three-dimensional object T by depositing the material supplied from the external material source on the build plate 134.

A structure of the extruder 140 is not particularly limited. For example, as shown in FIG. 2, the extruder 140 may include an extruder body 141 for ejecting the material supplied from the external material source, and a coupling 142 for coupling the extruder body 141 to the printer head 150, and the like.

The extruder body 141 has a nozzle shape. As shown in FIG. 2, the extruder body 141 may have an inlet 143 connected to the external material source to receive the material supplied from the external material source, and an outlet 144 through which the material introduced through the inlet 143 is ejected.

The coupling 142 may have a cylindrical shape in which the extruder body 141 may be fixedly inserted. As shown in FIG. 2, the coupling 142 may include a first screw thread 145 formed on an outer circumferential face thereof, and a guide groove 146 extending in the Z-axis direction and formed on the outer circumferential face. The first screw thread 145 of the coupling 142 is screw-coupled to a second screw thread 155 of the printer head 150 to be described later. A guide protrusion 152 of the printer head 150 to be described later is inserted into the guide groove 146 so as to be movable in the Z-axis direction. Thus, the coupling 142 may couple the extruder 140 to the printer head 150 such that the extruder may be movable in the Z-axis direction. Further details on the movement of the extruder 140 in the Z-axis direction will be described later.

The printer head 150 is a member for transporting the extruder 140 in a predetermined direction. A shape of the printer head 150 is not particularly limited. For example, as shown in FIG. 2, the printer head 150 may have a disk shape.

The printer head 150 is configured to transport the extruder 140 in 3 axial directions, that is, the X-axis direction, the Y-axis direction, and the Z-axis direction.

As shown in FIG. 6, the printer head 150 may be hinge-coupled to the printer base 130 via a hinge pin 160 to be described later so as to transport the extruder 140 in each of the X-axis direction and the Y-axis direction. The X-axis direction and Y-axis direction transfers of the extruder 140 using the hinge pin 160 will be described later.

Further, as shown in FIG. 6 and FIG. 7, the printer head 150 may include a first receiving hole 151 into which the coupling 142 may be inserted so as to be movable in the Z-axis direction in order to transport the extruder 140 in the Z-axis direction, the guide protrusion 152 protruding from an inner circumferential face of the first receiving hole 151 and inserted into the guide groove 146 of the coupling 142 so as to be movable in the Z-axis direction, and a Z-axis direction transfer member 153 for reciprocally transferring the coupling 142 and the extruder body 141 coupled thereto in the Z-axis direction.

As shown in FIG. 7, the first receiving hole 151 is perforated to have an inner diameter larger than an outer diameter of the coupling 142 by a predetermined ratio such that the coupling 142 may be inserted into the first receiving hole 151. The first receiving hole 151 is perforated so as to be located preferably in a center of the printer head 150. However, the disclosure is not limited thereto.

As shown in FIG. 7, the guide protrusion 152 protrudes from the inner circumferential face of the first receiving hole 151 such that at least a portion of the guide protrusion 152 is inserted into the guide groove 146 when the coupling 142 is inserted into the first receiving hole 151. Further, the guide protrusion 152 preferably has a predetermined height so as not to come into contact with the extruder body 141.

The Z-axis direction transfer member 153 is configured to reciprocally transfer the coupling 142 and the extruder body 141 coupled thereto in the Z-axis direction. For example, as shown in FIG. 8, the Z-axis direction transfer member 153 may have the second receiving hole 154 into which the coupling 142 may be inserted so as to be movable in the Z-axis direction, and a second screw thread 155 formed on an inner circumferential face of the second receiving hole 154 so as to be screw-coupled with the first screw thread 145 of the coupling 142. Thus, the coupling 142 may be inserted into the second receiving hole 154 such that the first screw thread 145 and the second screw thread 155 are screw-coupled to each other. In this way, the coupling 142 and the Z-axis direction transfer member 153 may be coupled to each other.

In one example, the printer head 150 may further include a seated groove 156 into which the Z-axis direction transfer member 153 is rotatably seated. In this case, as shown in FIG. 4, the Z-axis direction transfer member 153 may have a disk shape having a diameter smaller than that of the printer head 150 by a predetermined ratio. Further, as shown in FIG. 8, the seated groove 156 may be recessed into the top surface of the printer head 150 and have a larger diameter, by a predetermined ratio, than that of the Z-axis direction transfer member 153. Accordingly, the Z-axis direction transfer member 153 may be rotatably inserted into the seated groove 156 and have the second receiving hole 154 as a center thereof. In this way, the Z-axis direction transfer member 153 is installed. Thus, the Z-axis direction transfer member 153 is rotated, the coupling 142 and the extruder body 141 coupled thereto may reciprocate in the Z-axis direction under guidance of the guide protrusion 152 and the guide groove 146. For example, when the Z-axis direction transfer member 153 is rotated in one direction, the coupling 142 and the extruder body 141 coupled thereto may be transferred in an upward direction, whereas when the Z-axis direction transfer member 153 is rotated in the opposite direction, the coupling 142 and the extruder body 141 coupled thereto may be transported in a downward direction.

The hinge pin 160 is configured to hinge-couple the printer base 130 and the printer head 150 to each other. The number of hinge pins 160 to be installed is not particularly limited. For example, as shown in FIG. 2, the printer base 130 and the printer head 150 may be hinge-coupled to each other via three hinge pins 160.

A scheme of hinge-coupling the printer base 130 and the printer head 150 to each other using the hinge pin 160 is not particularly limited. For example, the hinge pin 160 may include a hinge ball 162 formed at one end thereof, a second hinge ring 164 formed at the other end thereof, and the like.

As shown in FIG. 8, the hinge ball 162 may be formed at an upper end of the hinge pin 160 and have a predetermined diameter. Correspondingly, as shown in FIG. 8, the printer head 150 may further include an XY position frame 157 having a hinge groove 158 defined therein into which the hinge ball 162 is hinge-coupled.

The XY position frame 157 is preferably coupled to a bottom face of the printer head 150. The number and installation positions of the XY position frames 157 are not particularly limited. For example, the number of the XY position frames 157 may be the same as the number of each of the first hinge rings 132 and the hinge pins 160. When a plurality of XY position frames 157 are installed, the XY position frames 157 may be arranged preferably by the same spacing as that of the first hinge rings 132. However, the disclosure is not limited thereto. Installing the XY position frames 157 I this way may allow the hinge ball 162 of each hinge pin 160 to be hinge-coupled to the hinge groove 158 of one of the XY position frames 157.

As shown in FIG. 9, the second hinge ring 164 may be formed at a lower end of the hinge pin 160 and have a ring shape. This second hinge ring 164 may be hinge-pivotally fastened to one of the first hinge rings 132 of the printer base 130.

As the hinge pins 160 are installed in this way, the printer head 150 may be hinge-pivot around the printer base 130 via the hinge pins 160. Thus, the printer head 150 and the extruder 140 coupled thereto may be transferred in each of the X-axis direction and the Y-axis direction. Accordingly, the printer head 150 may transport the extruder 140 in each of the X-axis direction and the Y-axis direction along the same movement path as that of the printer head 150 such that the material ejected from the extruder body 141 may be deposited on the build plate 134. Then, the operator may use the printer head 150 to move the extruder 140 along the transport path corresponding to the arbitrary deposition path in each of the X-axis direction and Y-axis direction such that the material ejected from the extruder body 141 is deposited on the build plate 134 along the arbitrary deposition path. Thus, a target three-dimensional object T having a three-dimensional structure corresponding to the arbitrary deposition path may be deposited on the build plate 134.

FIG. 10 is a conceptual diagram illustrating a method for collecting material deposition data using hinge pin inclination. FIG. 11 is a II-IF cross-sectional view of FIG. 2, and FIG. 12 is a partial enlarged view of FIG. 11.

The scanning unit 120 senses a chronological deposition process of the material on the build plate 134 using the extruder 140 and thus collects material deposition data including information on a process in which the chronological deposition of the material forms the target three-dimensional object T.

To this end, as shown in FIG. 1, the scanning unit 120 may include a sensing module 170 that senses movement of at least one of the extruder 140 and the printer head 150, a data collection module 180 that collects material deposition data including information on the arbitrary deposition path of the material based on the movement of at least one of the extruder 140 and the printer head 150 sensed by the sensing module 170, and a communication module 190 that transmits the deposition data to a communication module 210 of the server 200.

Further, as shown in FIG. 1, the sensing module 170 may include an X-Y axial sensor 171 configured to sense movement of the printer head 150 in each of the X-axis direction and the Y-axis direction, a check sensor 172 configured to sense movement of the printer head 150 in the X-axis direction and the Y-axis direction to assist the X-Y axial sensor 171, and a Z axial sensor 173 configured to sense movement of the extruder 140 in the Z-axis direction.

The X-Y axial sensor 171 is configured to sense the movement of the printer head 150 and the extruder 140 coupled thereto in each of the X-axis direction and the Y-axis direction when the operator moves the printer head 150 and the extruder 140 coupled thereto together in each of the X-axis direction and the Y-axis direction.

As shown in FIG. 10, when the operator moves the printer head 150 in each of the X-axial and Y-axis directions, each of the hinge pins 160 may be hinge-rotated and tilted in connection with the movement of the printer head 150 in each of the X-axial and Y-axis directions.

A lower end of each of the hinge pins 160, at which the second hinge ring 164 is formed, is set fastened to the printer base 130 fixed to the ground, and an upper end of each of the hinge pins 160, at which the hinge ball 162 is formed, is set fastened to the printer head 150, which is arranged to be freely movable. Therefore, when the operator moves the printer head 150 in each of the X-axis direction and the Y-axis direction, the hinge pins 160 are tilted while pivoting around the first hinge ring 132 to which the second hinge ring 164 is fastened. At this time, a position of the lower end of each of the hinge pins 160 is not changed, whereas only a position of the upper end of each of the hinge pins 160 is changed in connection with the movement of the printer head 150 in each of the X-axis direction and the Y-axis direction.

In one example, each of the hinge pins 160 is tilted while pivoting around the first hinge ring 132 to which the second hinge ring 164 is fastened. Thus, when the operator moves the printer head 150 in each of the X-axis direction and the Y-axis direction, the upper end of each of the hinge pins 160 and a position of the printer head 150 coupled thereto vary in the Z-axis direction.

Based on position change of the printer head 150, the data collection module 180 may apply a first inclination angle α, a second inclination angle β, and a length L of each of the hinge pins 160 into Equations 1 to 4 given, thereby calculating, in real time, movement coordinates X1, Y1, and Z1 related to the 3 axial directions, that is, the X-axis direction, the Y-axis direction, and the Z-axis direction of each of the printer head 150 and the extruder 140 coupled thereto when the operator moves the printer head 150 in each of the X-axis direction and the Y-axis direction.

$$L = X1^2 + Y1^2 + Z1^2 \quad \text{[Equation 1]}$$

$$X1 * \sin \alpha) * \cos \beta \quad \text{[Equation 2]}$$

$$Y1 = L * \sin \beta \quad \text{[Equation 3]}$$

$$Z1 = (L * \cos \alpha) * \cos \beta \quad \text{[Equation 4]}$$

L: length of hinge pin
X1: X-axial movement coordinate of printer head
Y1: Y-axial movement coordinate of printer head
Z1: Z-axis direction movement coordinate of printer head
L1: Length of hinge pin as viewed in X-axis direction
L2: Length of hinge pin as viewed in Y-axis direction In this regard, the X-axial movement coordinate X1 and the Y-axial movement coordinate Y1 of the printer head 150 indicate a location where the material ejected from the extruder 140 is deposited on the build plate 134. Further, the Z-axis direction movement coordinate Z1 of the printer head 150 refers to a displacement of a distance between the target three-dimensional object T deposited on the build plate 134 and the outlet 144 of the extruder body 141 as generated when the operator moves the printer head 150 in at least one of the X-axis direction and the Y-axis direction. When the operator moves the printer head 150 in at least one of the X-axis direction and the Y-axis direction, the distance between the outlet 144 of the extruder body 141 and the target three-dimensional object T deposited on the build plate 134 may be smaller than a predetermined reference. In this case, the extruder body 141 and the target three-dimensional object T may interfere with each other. Accordingly, the length L of each of the hinge pins 160 may be determined based on the Z-axis direction movement coordinate Z1 of the printer head 150, such that the extruder body 141 and the target three-dimensional object T do not interfere with each other.

The first inclination angle α represents an angle at which each of the hinge pins 160 is inclined from the Z-axis direction toward the X-axis direction, and may be obtained by measuring an inclination angle of each of the hinge pins 160 relative to the Z-axis direction on an XZ plane of the XYZ coordinate system. Further, the second inclination angle β represents an angle at which each of the hinge pins 160 is inclined from the Z-axis direction toward the Y-axis direction, and may be obtained by measuring an inclination angle of each of the hinge pins 160 relative to the Z-axis direction on an YZ plane of the XYZ coordinate system. Further, the length L of each of the hinge pins 160 is equal to a constant determined based on a design condition during manufacturing of the deposition data collection apparatus 100.

Thus, when the operator moves the printer head 150, the data collection module 180 may derive the movement in each of the X-axis direction and the Y-axis direction of each of the printer head 150 and the extruder 140 coupled thereto, based on the first inclination angle α and the second inclination angle β. To this end, the X-Y axial sensor 171 is configured to measure at least one inclination angle among the first inclination angle α and the second inclination angle β.

A scheme of measuring the inclination angle of each of the hinge pins 160 using the X-Y axial sensor 171 is not particularly limited. For example, the X-Y axial sensor 171 may be configured to measure an angle by which the second hinge ring 164 of each of the hinge pins 160 rotates around the first hinge ring 132 to which the second hinge ring 164 is coupled when the hinge pins 160 are tilted in connection with the movement of the printer head 150 in each of the X-axis direction and the Y-axis direction. To this end, the X-Y axial sensor 171 may be embodied as a capacitive type angle sensor capable of measuring change in capacitance generated when the second hinge ring 164 rotates around the first hinge ring 132. The data collection module 180 may calculate the inclination angle of each of the hinge pins 160 based on the rotation angle of the second hinge ring 164 measured by the X-Y axial sensor 171.

However, the X-Y axial sensor 171 may be configured to individually calculate each of the first inclination angle α and the second inclination angle β. For example, the X-Y axial sensor 171 may have an X axial sensor 174 configured to measure the first rotation angle representing an angle at which the second hinge ring 164 fastened to one of the first hinge rings 132 rotates around the Z-axis direction in the XZ plane of the XYZ coordinate system, and an Y axial sensor 175 configured to measure the second rotation angle indicating the angle at which the second hinge ring 164 fastened to another one of the first hinge rings 132 rotates around the Z-axis direction on the YZ plane of the YZ coordinate system.

Further, the X-axial sensor 174 is configured to measure the first rotation angle of the second hinge ring 164 fastened the first hinge ring 132a having the center-axis direction coinciding with the X-axis direction. Correspondingly, the Y axial sensor 175 is configured to measure the second rotation angle of the second hinge ring 164 fastened to the first hinge ring 132b having the center-axis direction coinciding with the Y-axis direction.

Each of the hinge pins 160 is tilted while the second hinge ring 164 rotates around the first hinge ring 132. Thus, the first rotation angle is the same as the first inclination angle α, and the second rotation angle is the same as the second inclination angle β. Accordingly, the data collection module 180 may calculate the first inclination angle α based on the first rotation angle measured by the X axial sensor 174, and may calculate the second inclination angle β based on the second rotation angle measured by the Y axial sensor 175.

The check sensor 172 is configured to check whether the X-Y axial sensor 171 is malfunctioning when the operator moves the printer head 150 and the extruder 140 coupled thereto together in each of the X-axis direction and the Y-axis direction.

For example, the check sensor 172 may be configured to measure a third rotation angle representing an angle by which the second hinge ring 164 fastened to the first hinge ring 132c having the center-axis direction defining a predetermined angle with respect to each of the X-axis direction and the Y-axis direction in the XY plane of the XYZ coordinate system rotates around the Z-axis direction in a two-dimensional plane defined by the Z-axis and the central axis of the first hinge ring 132c. The check sensor 172 may be embodied as a capacitive type angle sensor capable of measuring a change in capacitance that is generated when the second hinge ring 164 rotates around the first hinge ring 132c.

The center-axis direction of the first hinge ring 132c defines the predetermined angle with respect to each of the X-axis direction and the Y-axis direction. Thus, each of the center-axis direction of the first hinge ring 132c and the third rotation angle may include both the X-axis direction component and the Y-axis direction component. Accordingly, the data collection module 180 may determine whether the X-Y axial sensor 171 is malfunctioning based on the third rotation angle. For example, the data collection module 180 may be configured such that when a displacement of the third rotation angle is detected by the check sensor 172, but at least one of a displacement of the first rotation angle and a displacement of the second rotation angle is not detected by the X-Y axial sensor 171, the module 180 may determine that the X-Y axial sensor 171 is malfunctioning. In this case, a controller of the deposition data collection apparatus 100 may control an alarm device, a display device, and other output devices to notify the fact that the sensor is malfunctioning and to terminate the deposition data collection operation. However, the disclosure is not limited thereto.

The Z axial sensor 173 is configured to sense the movement of the extruder 140 in the Z-axis direction when the operator individually moves the extruder 140 in the Z-axis direction by rotating the Z-axis direction transfer member 153.

As shown in FIG. 11 and FIG. 12, the Z axial sensor 173 may have a pinion gear 176 rotatably disposed at one end thereof. Correspondingly, the coupling 142 of the extruder 140 may further include a rack gear 147 extending in the Z-axis direction so as to mesh with the pinion gear 176, wherein the rack gear 146 is formed on at least one of a left inner circumferential face and a right inner circumferential face of the guide groove 146. In this case, the Z axial sensor 173 may be fixedly installed at a predetermined position of the printer head 150 so as to measure the number of rotations by which the pinion gear 176 rotates against the rack gear 147 when the extruder 140 is transferred in the Z-axis direction by the Z-axis direction transfer member 153. For example, as shown in FIG. 12, the Z axial sensor 173 may be fixedly installed on a bottom face of the printer head 150 such that the pinion gear 176 meshes with the rack gear 147.

The Z-axis direction sensor 173 may be embodied as a capacitive type displacement sensor capable of sensing change in capacitance that is generated when the extruder 140 is transferred in the Z-axis direction by the Z-axis direction transfer member 153 and thus the pinion gear 176 rotates against the rack gear 147. However, the disclosure is not limited thereto.

The data collection module 180 may calculate the Z-axis direction movement coordinate of the extruder 140 achieved by the Z-axis direction transfer member 153, based on the number and a direction of the rotation of the pinion gear 176 sensed by the Z axial sensor 173 in real time.

Hereinafter, a method of collecting material deposition data using the deposition data collection apparatus 100 will be described with reference to the drawings.

First, the operator causes the extruder body 141 to eject the material supplied from the external material source while the operator holds the printer head 150 or the extruder 140 by hand or using other members. Then, the operator manually manipulates the printer head 150 or extruder 140 such that the printer head 150 and the extruder 140 move together in each of the X-axis direction and the Y-axis direction along the movement path corresponding to the arbitrary deposition path of the material. Then, the material ejected from the extruder body 141 is deposited on the build plate 134 along the arbitrary deposition path. At this time, the data collection module 180 calculates, in real time, the movement coordinates X1, Y1, and Z1 in the three axes of the printer head 150 and the extruder 140 coupled thereto, based on a signal for the first inclination angle α and the second inclination angle β as input in real time from the X-Y axial sensor 171 and auxiliary sensors. Thus, the module 180 may collect chronologically the material deposition data including information on the arbitrary deposition path of the material and information about the deposition process of the target three-dimensional object T.

Then, when the operator determines that deposition of a specific layer of the target three-dimensional object T on the build plate 134 has been completed, the operator may use the Z-axis direction transfer member 153 to raise up the extruder 140 by a vertical distance corresponding to a thickness of the specific layer of the target three-dimensional object T. At this time, as shown in FIG. 11, the data collection module 180 may calculate in real time the Z-axis direction movement coordinate Z2 of the extruder 140 achieved by the Z-axis direction transfer member 153, based on a signal for the number of rotations and the rotation direction of the pinion gear 176 as input in real time from the Z axial sensor 173, and thus may chronologically collect the material deposition data including information on whether or not deposition of the specific layer of the target three-dimensional object T has been completed, and information on the thickness of the specific layer of the target three-dimensional object T.

The operator may repeatedly performing the above-described deposition formation process of the specific layer of the target three-dimensional object T and the vertical level adjustment process of the extruder 140 to gradually form the target three-dimensional object T. In response to this repetition, the data collection module 180 chronologically collects the material deposition data including information on the arbitrary deposition path of the material for forming the specific layer of the target three-dimensional object T, and information on a vertical level adjustment time and a vertical level adjustment amount of the extruder 140.

The communication module 190 transmits the material deposition data as collected by the data collection module 180 to the communication module 210 of the server 200 to be described later. The communication module 190 may transmit the deposition data to the communication module 210 of the server 200 at the same time when the data is collected. The disclosure is not limited thereto. A type of a communication device that may be used as the communication module 190 is not particularly limited. The communication module 190 may include various types of wired/wireless communication devices based on Bluetooth and Wi-Fi.

FIG. 13 is a flowchart for illustrating a three-dimensional object manufacturing method using the three-dimensional object manufacturing system shown in FIG. 1, and FIG. 14 is a drawing for illustrating a method for converting deposition data to generate 3D modeling data of a target three-dimensional object.

Next, the server 200 is a device for generating 3D modeling data of the target three-dimensional object T using the material deposition data received from the communication module 190 of the deposition data collection apparatus 100.

A structure of the server 200 is not particularly limited. For example, as shown in FIG. 1, the server 200 may include the communication module 210 for wired/wireless communication, a data storage module 220 in which the material deposition data received from the communication module 190 of the deposition data collection apparatus 100 through the communication module 210 is stored, and a 3D modeling module 230 that converts the material deposition data input from the data storage module 220 to generate the 3D modeling data of the target three-dimensional object T.

A type of a communication device embodied as the communication module 210 is not particularly limited. For example, the communication module 210 may include various types of wired/wireless communication devices based on Bluetooth and Wi-Fi. This communication module 210 may be connected to the communication module 190 of the deposition data collection apparatus 100 as described above, a communication module 310 of the three-dimensional object output apparatus 300 to be described later, and communication modules of various other devices in a wired or wireless manner, and thus may communicate various data therewith.

The data storage module 220 is configured to store therein the material deposition data, data on characteristics of the material, and other various data. The material characteristics data may include information on at least one of a type, a color, and a viscosity of the material. The data storage module 220 has the same structure as that of conventional database, and a detailed description thereof will be omitted.

The 3D modeling module 230 is configured to convert the material deposition data input from the data storage module 220 to generate the 3D modeling data including information about the three-dimensional structure of the target three-dimensional object T. Referring to FIG. 13, the 3D modeling data is data that visualizes the material deposition data collected by the deposition data collection apparatus 100, and refers to data including information about the three-dimensional structure of the target three-dimensional object T.

As described above, the material deposition data may include information on the process of forming the specific layer of the target three-dimensional object T by the operator manually operating the printer head 150 or the extruder 140 such that the material is deposited along the arbitrary deposition path; information on a process of changing a layer of the target three-dimensional object T on which the material is deposited by the operator manually operating the Z-axis transfer member such that the extruder 140 is transferred in the Z-axis direction, etc. This deposition data may be 4D data including a deposition location of the material and a chronological deposition process of the material.

The 3D modeling module 230 changes the information about the layer formation process and the layer change process as included in the material deposition data, thereby generating the 3D modeling data including at least the information about the three-dimensional structure of the target three-dimensional object T. Here, the 3D modeling data refers to data that visualizes the material deposition data as the 4D data, and thus may include both the information about the three-dimensional structure and the chronological formation process of the target three-dimensional object T.

Hereinafter, a process in which the 3D modeling module 230 generates the 3D modeling data using the material deposition data is described.

First, the 3D modeling module 230 may specify the arbitrary deposition path of the material in the specific layer, based on the X-axis movement coordinate data X1 and the Y-axis movement coordinate data Y1 of the extruder 140 when forming the specific layer of the target three-dimensional object T. Further, the 3D modeling module 230 may derive 2D coordinate data, that is, each of X-axis coordinate data and Y-axis coordinate data about the specific layer of the target three-dimensional object T, based on the specified arbitrary deposition path of the material.

Next, the 3D modeling module may specify a thickness of the specific layer of the target three-dimensional object T, based on the Z-axis movement coordinate data Z2 of the extruder 140 when changing a layer of the target three-dimensional object T on which the material is to be deposited from the specific layer to a next layer. Further, the 3D modeling module 230 may generate Z-axis coordinate data related to the specific layer of the target three-dimensional object T, based on the thickness of the specific layer as specified.

Thereafter, the 3D modeling module 230 may combine the X-axis coordinate data, the Y-axis coordinate data, and the Z-axis coordinate data related to the specific layer of the target three-dimensional object T as derived as above with each other, thereby generating the 3D coordinate data related to the specific layer of the target three-dimensional object T. In this case, as shown in FIG. 14, the 3D modeling module 230 preferably assigns a coordinate value on the XYZ coordinate system to each point of the target three-dimensional object T based on a predetermined resolution.

The 3D modeling module 230 individually generates the 3D coordinate data related to each of all of layers of the target three-dimensional object T in the above manner, and then combines the 3D coordinate data of all of the layers to generate the 3D modeling data including information about an entire three-dimensional structure and a formation process of the target three-dimensional object T. The generated 3D modeling data may be stored in the data storage module 220.

In one example, the 3D modeling module 230 may generate the 3D modeling data by combining the 3D coordinate data and the material characteristics data input from the data storage module 220 with each other. The material characteristics such as color and viscosity may affect an outer shape and a three-dimensional structure of the target three-dimensional object T. Thus, the 3D modeling data is generated with reference to the material characteristics data.

A conventional method includes scanning an outer shape of a previously completed target three-dimensional object using a scanner based on light, ultrasound, etc. to generate data including information about the outer shape of the target three-dimensional object T, and then correcting or converting the scanning data using reverse engineering SW, modeling SW, etc. to generate 3D modeling data including information about the entire three-dimensional structure of the target three-dimensional object T.

An inner structure of the target three-dimensional object cannot be grasped only based the scanning data including information about only the outer shape of the target three-dimensional object. Thus, conventionally, there was no choice but to generate the 3D modeling data of the target three-dimensional object via analyzing the scanning data using reverse engineering SW and modeling SW to estimate the inner structure of the target three-dimensional object. According to the conventional 3D modeling data generating method, accurate 3D modeling data about irregular dimensional objects such as food (dishes, cakes, instant dishes, etc.), handmade products (using a 3D pen, etc.), art products (oil painting art, mug cups, crafted figurines) whose the inner structure is irregular may not be secured. Accordingly, the conventional 3D modeling data generating method could be used limitedly only in 3D printing of products whose dimensions are clearly defined, such as a regular design.

However, the three-dimensional object manufacturing system 1 may generate the 3D coordinate data related to each of all of the layers of the target three-dimensional object T based on the material deposition data as collected including information about the chronological deposition formation process of the target three-dimensional object T when the material is deposited to form the target three-dimensional object T, and then may combine the generated 3D coordinate data related to all the layers with each other to generate the 3D modeling data. According to this three-dimensional object manufacturing system 1, without need to estimate the inner structure of the target three-dimensional object T using reverse engineering SW, the 3D modeling data including information about the inner structure of the target three-dimensional object T may be generated. Accordingly, the three-dimensional object manufacturing system 1 may secure 3D modeling data including accurate information on the inner and outer structures of the irregular three-dimensional object, and thus may be applied not only to 3D printing of products with clearly defined dimensions, but also to 3D printing of irregularly shaped products such as food.

Further, the three-dimensional object manufacturing system 1 is capable of immediately converting the material deposition data collected chronologically when the target three-dimensional object T is formed, thereby generating the 3D modeling data in real time. Thus, at the same time when the target three-dimensional object T is formed, the 3D modeling data may be generated Accordingly, the three-dimensional object manufacturing system 1 may reduce a time required to generate the 3D modeling data compared to the conventional 3D modeling method that requires generating the 3D modeling data only after the formation completion of the target three-dimensional object.

Next, the three-dimensional object output apparatus 300 is an apparatus for outputting a product having a structure corresponding to the target three-dimensional object T as formed by depositing the material using the 3D modeling data received from the server 200.

This three-dimensional object output apparatus 300 is configured to perform 3D printing using the 3D modeling data generated by converting the deposition data as the 4D data to produce a product and output the produced product. For example, as shown in FIG. 1, the three-dimensional object output apparatus 300 may include the communication module 310 for wired and wireless communication, and a data storage module 320 in which the 3D modeling data received through the communication module 310 is stored, a data conversion module 330 that converts the 3D modeling data stored in the storage module 320 to generate output data for product output, and a printing unit 340 that deposits the material using the output data to output a product having a structure corresponding to the target three-dimensional object T.

A type of a communication device embodied as the communication module 310 is not particularly limited. For example, the communication module 310 may include various types of wired/wireless communication devices based on Bluetooth and Wi-Fi. The communication module 310 may be connected to the communication module 210 of the server and the communication modules of various other devices in a wired or wireless manner and communicate various data therewith.

The data storage module 320 is configured to store the 3D modeling data received from the server 200 through the communication module 310. The data storage module 320 has the same structure as that of conventional database, and a detailed description thereof will be omitted.

The printing unit 340 may be configured to have the same structure as that of the printing unit 110 of the deposition data collection apparatus 100 or may be embodied as a general 3D printer having a structure different from that of the printing unit 110 of the deposition data collection apparatus 100.

When the printing unit 340 has the same structure as that of the printing unit 110, the product may be output based on the 3D modeling data without a process of converting the 3D modeling data via the data conversion module 330. In this case, a driving member (not shown) for automatically transporting the printer head 150 and the extruder 140 in the 3-axial directions may be mounted at a hinge connector between the hinge pin 160 and the printer head 150 of the printing unit 340, a hinge connector between the printer base 130 and the hinge pin 160, a connector between the extruder 140 and the Z-axis direction transfer member 153, etc.

When the printing unit 340 is embodied as the conventional 3D printer having a structure different from that of the printing unit 110, the data conversion module 330 may convert the 3D modeling data using techniques such as slicing and G-CODE conversion, etc. to generate the output data suitable for producing a product via the printing unit 340.

As shown in FIG. 13, the printing unit 340 may automatically output a product having the same structure as that of the target three-dimensional object T or a structure corresponding to that of the target three-dimensional object T, via 3D printing. Thus, the three-dimensional object manufacturing system 1 may mass-manufacture the product having the same structure as or a structure corresponding to that of the target three-dimensional object T as produced manually by the operator.

FIG. 15 is a perspective view of a deposition data collection apparatus of a three-dimensional object manufacturing system according to a second embodiment of the present disclosure. FIG. 16 is a cross-sectional view of FIG. 15. FIG. 17 is a perspective view showing a tilted state of each of hinge pins in the deposition data collection apparatus shown in FIG. 15. FIG. 18 is a IV-IV' cross-sectional view of FIG. 17.

The three-dimensional object manufacturing system according to the second embodiment of the present disclosure is different from the three-dimensional object manufacturing system 1 according to the first embodiment of the present disclosure as described above in that a structure of the printing unit 410 of the deposition data collection apparatus 400 is modified. Hereinafter, the deposition data collection apparatus 400 will be described based on the modified structure of the printing unit 410. The components having the same configuration as included in both the deposition data collection apparatuses 100 and 400 will be described using the same reference numerals.

The extruder 440 has a diameter smaller than that of the first receiving hole 451 by a predetermined ratio such that the extruder may be rotatably inserted into the first receiving hole 451 of the printer head 450. The extruder 440 may have a receiving space 441 formed therein to accommodate the material therein, an outlet 443 defined at a bottom through which the material accommodated in the receiving space 441 is ejected, a piston receiving hole 445 drilled in an upper end to receive the piston 457 therein, and a flange 447 formed along a circumference of the upper end such that the flange may be stopped by the printer head 450.

Further, each of the receiving space 441 and the piston receiving hole 445 may have an inner diameter equal to or larger than a diameter of the piston 457 by a predetermined ratio such that the piston 457 may slide therein in the Z-axis direction.

Further, the flange 447 may have first bar receiving holes 447a drilled in the Z-axis direction to receive therein guide bars 453b of the Z-axis direction transfer member 453 to be described later, respectively.

The extruder 440 is inserted into the first receiving hole 451 such that the flange 447 is stopped by the printer head 450. For example, as shown in FIG. 16, the printer head 450 has a seated groove 455 that is recessed in the top surface as to be concentric with the first receiving hole 451, and the extruder 440 is installed such that the flange 447 is stopped by the bottom face of the seated groove 455. Then, the extruder 440 may be coupled to the printer head 450 so as to protrude from the printer head 450 toward the printer base 430. Accordingly, the extruder 440 preferably has a predetermined length so as to be spaced apart from the build plate 432 or the target three-dimensional object T formed on the build plate 432 by a predetermined clearance.

The Z-axis direction transfer member 453 may include a housing 453a, the guide bars 453b, and a coupling 453c.

The housing 453a may have a cylindrical shape having an inner diameter larger than the outer diameter of the flange 447 by a predetermined ratio. The housing 453a may have a first screw thread 453d formed on an inner circumferential face. This housing 453a may be concentric with the first receiving hole 451, and may be coupled to the bottom face of the seated groove 455 so as to surround a circumference of the flange 447.

Each of the guide bars 453b has a shape corresponding to that of the first bar receiving hole 447a such that the guide bar may be inserted into one of the first bar receiving holes 447a of the flange 447. In addition, each of the guide bars 453b has a predetermined length such that a lower end thereof may be inserted into the first bar receiving hole 447a and an upper end thereof may extend to an outside of the housing 453a.

The coupling 453c has an outer diameter equal to the inner diameter of the housing 453a or smaller than the inner diameter of the housing 453a by a predetermined ratio so as to be movable in the Z-axis direction inside the housing 453a. The coupling 453c may have a second screw thread 453e formed on an outer circumferential face so as to be screw-coupled to the first screw thread 453d of the housing 453a, and second bar receiving holes 453f drilled in the Z-axis direction such that one of the guide bars 453b is movably inserted therein in the Z-axis direction.

The coupling 453c is installed in the housing 453a such that the second screw thread 453e is screw-coupled to the first screw thread 453d, and each of the guide bars 453b is movably inserted into each of the second bar receiving holes 453f in the Z-axis direction.

The piston 457 includes a pressing plate 457a inserted into the receiving space 441 of the extruder 440 so as to be movable in the Z-axis direction, a fixed plate 457b fixed to the coupling 453c, and a shaft 457c connecting the pressing plate 457a and the fixing plate 457b to each other. In one example, a hinge connection structure between the printer head 450 and the printer base 430 via the hinge pins 460 and the material deposition data collection method using the scanning unit 120 are the same as those of the deposition data collection apparatus 400 as described above. Thus, a detailed description thereof will be omitted.

Hereinafter, a method of additive manufacturing a target three-dimensional object T using a deposition data collection apparatus 400 will be described with reference to the drawings.

First, as shown in FIG. 16, the material constituting the target three-dimensional object T is filled in the receiving space 441 of the extruder 440.

Next, as shown in FIG. 17 and FIG. 18, while an wearer holds the extruder 440 or the printer head 450 with a hand or a different member, the operator manually manipulate the extruder 440 or the printer head 450 such that the hinge pins 460 are tilted to cause the extruder 440 and the printer head 450 to move along the arbitrary deposition path. At the same time, the wearer rotates the extruder 440 using a hand or a different member. Then, the guide bars 453b inserted into the first bar receiving holes 447a of the flange 447 rotate along with the extruder 440, and the coupling 453c is rotationally driven by the guide bars 453b. However, the coupling 453c is screw-coupled to the housing 453a, such that the coupling 453c is rotationally driven by the guide bars 453b and at the same time, moves in the Z-axis direction along the first screw thread 453d of the housing 453a. Further, the piston 457 having the fixed plate 457b fixed to the coupling 453c also moves in the Z-axis direction. Then, the material pressed by the pressure plate 457a of the piston 457 is ejected out of the extruder 440 through the outlet 443, and is deposited on the build plate 432 along the arbitrary deposition path.

In this way, the wearer may form the target three-dimensional object T having the three-dimensional structure corresponding to the arbitrary deposition path on the build plate 432. In one example, the scanning unit 120 may collect the material deposition data in real time when the wearer forms the target three-dimensional object T in the above manner, and transmit the data to the server 200.

The above description is merely an exemplary description of the technical idea of the present disclosure, and a person with ordinary knowledge in the technical field to which the present disclosure belongs may make various modifications and variations within the scope that does not deviate from the essential characteristics of the present disclosure.

Therefore, the embodiments disclosed in the present disclosure are intended for description of rather than limiting of the technical idea of the present disclosure. The scope of the technical idea of the present disclosure is not limited by these embodiments. The scope of protection of the present disclosure should be interpreted by the claims below, and all technical ideas within the scope equivalent thereto should be interpreted as being included in the scope of the present disclosure.

The invention claimed is:

1. A deposition data collection apparatus comprising:
a printing unit including:
an extruder for ejecting a material supplied from an external material source; and
a printer head for moving the extruder in a predetermined direction such that the material ejected from the extruder are sequentially deposited on an XYZ coordinate system to form a target three-dimensional object; and
a scanning unit including:
a sensing module for sensing movement of at least one of the extruder and the printer head; and
a data collection module for chronologically collecting material deposition data, based on the movement sensed by the sensing module,
wherein the extruder is coupled to the printer head so as to move along the printer head,
wherein the printing unit further includes:
a printer base installed to be spaced apart from the printer head in a Z-axis direction on the XYZ coordinate system; and
at least one hinge pin for hinge-coupling the printer head and the printer base to each other such that the printer head is moveable in at least one of an X-axis direction and a Y-axis direction on the XYZ coordinate system,
wherein the sensing module includes an X-Y axial sensor for sensing at least one of:
a first inclination angle indicating an angle at which each of the at least one hinge pin is inclined from the Z-axis direction toward the X-axis direction on the XYZ coordinate system; and
a second inclination angle indicating an angle at which each of the at least one hinge pin is inclined from the Z-axis direction toward the Y-axis direction on the XYZ coordinate system, and
wherein the data collection module calculates a movement coordinate of the extruder in at least one of the X-axis direction and the Y-axis direction based on at least one of the first inclination angle and the second inclination angle sensed by the X-Y axial sensor.

2. The apparatus of claim 1, wherein the first inclination angle is an inclination angle measured based on the Z-axis direction on an XZ plane of the XYZ coordinate system, and wherein the second inclination angle is an inclination angle measured based on the Z-axis direction on a YZ plane of the XYZ coordinate system.

3. The apparatus of claim 1, wherein the data collection module calculates a displacement amount by which the printer head moves in the Z-axis direction when each of the at least one hinge pin is tilted, based on the at least one of the first inclination angle and the second inclination angle.

4. The apparatus of claim 1, wherein the data collection module collects the material deposition data based on the movement coordinate of the extruder.

5. The apparatus of claim 2, wherein the printer base has at least one first hinge ring having a ring shape, and wherein each of the at least one hinge pin has a second hinge ring having a ring shape and rotatably fastened to each of the at least one first hinge ring.

6. The apparatus of claim 5, wherein the X-Y axial sensor measures a rotation angle by which the second hinge ring rotates about the at least one first hinge ring when the at least one hinge pin is tilted in connection with the movement of the printer head, and wherein the data collection module calculates the at least one of the first inclination angle and the second inclination angle based on the rotation angle measured by the X-Y axial sensor.

7. The apparatus of claim 6, wherein the X-Y axial sensor includes a capacitive type angle sensor for sensing change in capacitance generated when the second hinge ring rotates around the at least one first hinge ring.

8. The apparatus of claim 6, wherein the X-Y axial sensor includes:
   a X axial sensor for measuring a first rotation angle by which a second hinge ring fastened to one of the at least one first hinge ring rotates around the Z-axis direction on the XZ plane of the XYZ coordinate system; and
   a Y axial sensor for measuring a second rotation angle by which a second hinge ring fastened to another of the at least one first hinge ring rotates around the Z-axis direction on the YZ plane of the XYZ coordinate system,
   wherein the data collection module calculates the first inclination angle based on the first rotation angle and calculates the second inclination angle based on the second rotation angle.

9. The apparatus of claim 8, wherein one of the at least one first hinge ring is installed such that a center-axis direction thereof coincides with the X-axis direction, and wherein another one of the at least one first hinge ring is installed such that a center-axis direction thereof coincides with the Y-axis direction.

10. The apparatus of claim 9, wherein still another one of the at least one first hinge ring is installed such that a center-axis direction thereof defines a predetermined angle with respect to each of the X-axis direction and the Y-axis direction on an XY plane on the XYZ coordinate system,
   wherein the sensing module further includes a check sensor for sensing a third rotation angle by which a second hinge ring fastened to the still another one of the at least one first hinge ring rotates around a Z axial direction on a two-dimensional plane defined by a Z axis and a central axis of the still another one of the at least one first hinge ring, and
   wherein the data collection module is configured to determine that abnormality has occurred in the X-Y axial sensor when a displacement of the third rotation angle is detected by the check sensor but a displacement of at least one of the first rotation angle and the second rotation angle is not detected by the X-Y axial sensor.

11. The apparatus of claim 1, wherein the printing unit further includes a build plate on which the material ejected from the extruder is deposited.

12. A deposition data collection apparatus comprising:
   a printing unit including:
      an extruder for ejecting a material supplied from an external material source; and
      a printer head for moving the extruder in a predetermined direction such that the material ejected from the extruder are sequentially deposited on an XYZ coordinate system to form a target three-dimensional object; and
   a scanning unit including:
      a sensing module for sensing movement of at least one of the extruder and the printer head; and
      a data collection module for chronologically collecting material deposition data, based on the movement sensed by the sensing module,
   wherein the printing unit further includes a Z-axis direction transfer member for transferring the extruder in a Z-axis direction on the XYZ coordinate system, and wherein the sensing module has a Z-axis direction sensor for sensing movement of the extruder in the Z-axis direction,
   wherein the printer head has a first receiving hole defined therein into which the extruder is inserted so as to be movable in the Z-axis direction, and wherein the Z-axis direction transfer member has a second receiving hole defined therein into which the extruder is inserted so as to be movable in the Z-axis direction, and
   wherein the extruder has a guide groove recessed in an outer circumferential face thereof and extending in the Z-axis direction, and wherein the printer head further includes a guide protrusion extending in the Z-axis direction and protruding from an inner circumferential face of the first receiving hole so as to be inserted into the guide groove.

13. The apparatus of claim 12, wherein the Z-axis direction transfer member is coupled to the printer head so as to be rotatable about the Z-axis direction in the XYZ coordinate system,
   wherein the extruder further has a first screw thread formed on an outer circumferential face thereof, and
   wherein the Z-axis direction transfer member further has a second screw thread formed on an inner circumferential face of the second receiving hole so as to be screw-coupled to the first screw thread.

14. The apparatus of claim 12, wherein the extruder further includes a rack gear formed on an inner circumferential face of the guide groove and along the Z-axis direction,
   wherein a Z axial sensor has a pinion gear meshed with the rack gear, and
   wherein the Z axial sensor is fixedly installed at a predetermined position of the printer head, and configured to measure a number of rotations by and a rotation direction in which the pinion gear rotates under movement of the rack gear when the extruder is transferred in the Z-axis direction by the Z-axis direction transfer member.

15. The apparatus of claim 14, wherein the data collection module calculates a Z-axis movement coordinate of the extruder based on the number of rotations and the rotation direction of the pinion gear.

* * * * *